United States Patent
Baniecki et al.

(10) Patent No.: US 8,313,726 B2
(45) Date of Patent: Nov. 20, 2012

(54) GAS GENERATOR AND GAS GENERATION METHOD

(75) Inventors: John David Baniecki, Kawasaki (JP);
Masatoshi Ishii, Kawasaki (JP);
Kazuaki Kurihara, Kawasaki (JP);
Kazunori Yamanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/292,247

(22) Filed: Nov. 9, 2011

(65) Prior Publication Data

US 2012/0058041 A1    Mar. 8, 2012

Related U.S. Application Data

(63) Continuation of application No. PCT/JP2010/053911, filed on Mar. 9, 2010.

(30) Foreign Application Priority Data

May 15, 2009    (WO) .................. PCT/JP2009/059078

(51) Int. Cl.
*C01B 3/06*    (2006.01)
*C01B 31/18*    (2006.01)
*B01J 7/00*    (2006.01)
*C01B 4/00*    (2006.01)

(52) U.S. Cl. ........... 423/659; 48/61; 48/197 R; 422/198; 422/240; 423/418.2; 423/647.7; 423/657

(58) Field of Classification Search ............... 423/418.2, 423/657, 659, 647.7; 422/129, 198, 240; 48/61, 197 R
See application file for complete search history.

(56) References Cited

U.S. PATENT DOCUMENTS

| | | | | |
|---|---|---|---|---|
| 2,334,211 A | * | 11/1943 | Miller | 422/198 |
| 3,372,996 A | * | 3/1968 | Barrett et al. | 422/129 |
| 5,911,964 A | | 6/1999 | Iwanami et al. | |
| 7,896,934 B2 | * | 3/2011 | Curello et al. | 48/61 |
| 2001/0041806 A1 | | 11/2001 | Miyamoto et al. | |
| 2004/0013577 A1 | * | 1/2004 | Ganguli et al. | 422/129 |
| 2005/0100496 A1 | * | 5/2005 | Blaschke et al. | 423/418.2 |
| 2006/0013762 A1 | * | 1/2006 | Kuipers et al. | 423/651 |

FOREIGN PATENT DOCUMENTS

| | | |
|---|---|---|
| JP | 5-068853 A | 3/1993 |
| JP | 5-293364 A | 11/1993 |
| JP | 5-301705 A | 11/1993 |

(Continued)

OTHER PUBLICATIONS

International Search Report of PCT/JP2010/053911, mailing date Jun. 15, 2010.

(Continued)

*Primary Examiner* — Wayne Langel
(74) *Attorney, Agent, or Firm* — Westerman, Hattori, Daniels & Adrian, LLP

(57) ABSTRACT

A gas generator includes a processing vessel defining a processing space and holding a support body therein, an evacuation system evacuating the processing space; a metal oxide film of a perovskite structure containing oxygen defects formed on the support body, a source gas supplying port supplying a source gas containing molecules of a source compound of carbon dioxide or water into the processing space, a gas outlet port for extracting a product gas containing molecules of a product compound in which oxygen atoms are removed from said source compound, and a heating part heating the support body.

20 Claims, 20 Drawing Sheets

FOREIGN PATENT DOCUMENTS

| | | |
|---|---|---|
| JP | 6-016407 A | 1/1994 |
| JP | 7-068171 A | 3/1995 |
| JP | 7-069615 A | 3/1995 |
| JP | 8-054364 A | 2/1996 |
| JP | 9-000876 A | 1/1997 |
| JP | 2931340 B2 | 8/1999 |
| JP | 2000-233917 A | 8/2000 |
| JP | 2002-120860 A | 4/2002 |
| JP | 2003-088344 A | 3/2003 |
| JP | 2006-144023 A | 6/2006 |
| JP | 2006-298707 A | 11/2006 |
| JP | 2009-172479 A | 8/2009 |

OTHER PUBLICATIONS

Kanter, James, "Gore and Branson announce a $25 million prize for reducing global warming", The New York Times, International Herald Tribune, Feb. 2007.

Saito, Yoshinori et al., "Development of CO2 Absorbent with Barium Orthotitanate Ceramics", Fuel Cell, 2005, vol. 5 No. 2.

\* cited by examiner

GAS GENERATOR AND GAS GENERATION METHOD

CROSS-REFERENCE TO RELATED APPLICATIONS

This application is a U.S. continuation application filed under 35 USC 111a and 365c of PCT application JP2010/053911, filed Mar. 9, 2010, which claims priority from PCT application JP2009/059078, filed May 15, 2009. The entire contents of the foregoing applications are herein incorporated by reference.

FIELD

The embodiments described herein relate to a gas generator and a gas generation method.

BACKGROUND

Carbon dioxide ($CO_2$) gas is one of the major greenhouse effect gases and it is said that increase of the carbon dioxide gas in the atmosphere is the cause of the problem of global warming. Thus, investigations are being made for the technologies capable of removing carbon dioxide gas from the atmosphere and also for the technologies capable of processing the removed carbon dioxide gas.

For example, so-called "carbon capture and storage technology" is a promising technology enabling mass removal of carbon dioxide gas emitted from power plants or factories by capturing and burying the same under the seabed for storage or by enabling liquescence or solidification.

On the other hand, a large social impact would be attained if there is realized a technology capable of converting the carbon dioxide gas removed from the air or environment to other form or other compound suitable for storage or capable of reacting with other gases or suitable for supplying to devices such as a fuel cell with low cost.

Further, a hydrogen gas is used these days in various fields including the field of energy such as fuel cells and chemical industries. Conventionally, hydrogen gases have been produced mainly by electrolysis of water or by extraction from natural gases. However, electrolysis of water consumes a large amount of electric energy. Thus, if the technology capable of extracting a hydrogen gas from the water vapor contained in the air with low cost is realized, a large social impact would be attained similarly to the case of the carbon dioxide gas.

PRIOR ART REFERENCES

Patent References

[Patent Reference 1] Japanese Laid-Open Patent Publication 9-876
[Patent Reference 2] Japanese Laid-Open Patent Publication 2002-120860
[Patent Reference 3] Japanese Laid-Open Patent Publication 5-293364
[Patent Reference 4] Japanese Laid-Open Patent Publication 2006-298707
[Patent Reference 5] Japanese Patent 2931340
[Patent Reference 6] Japanese Laid-Open Patent Publication 2003-88344
[Patent Reference 7] Japanese Laid-Open Patent Publication 8-54364

Non-Patent References

[NON-PATENT REFERENCE 1] International Herald Tribune, Feb. 12, 2007
[NON-PATENT REFERENCE 2] Saito, Y., et al., Fuel Cell vol. 5, No. 2, 2005

SUMMARY

According to an aspect, there is provided a gas generator comprising: a processing vessel defining a processing space and holding a support body in said processing vessel; an evacuation system coupled to said processing vessel and evacuating said processing space; a metal oxide film of a perovskite structure containing oxygen defects formed on said support body; a source gas supplying port supplying a source gas containing molecules of a source compound of carbon dioxide or water into said processing space; and a gas outlet port for extracting a product gas containing molecules of a product compound in which oxygen atoms are removed from said source compound; and a heating part heating said support body.

In another aspect, there is provided a gas generation method conducted by a gas generator, said gas generator comprising a processing vessel defining a processing space and holding a support member in said processing space; a metal oxide film of a perovskite structure and containing oxygen defects formed on said support member; a source gas supplying port provided to said processing vessel for supplying a source gas containing a source compound in the form of molecules into said processing space from an outside of said processing vessel; a gas outlet port provided to said processing vessel and taking out a product gas produced at a surface of said metal oxide film and containing a product compound in which oxygen atoms are removed from said source compound; and a heating part heating said support body, said method comprising: (A) evacuating said processing vessel; (B) introducing said source gas into said processing space via said source gas supplying port and causing dissociation in said source compound to form said product compound by said metal oxide film; (C) taking out said product gas out of said processing vessel from said processing space via said gas outlet port; and (D) heating, after said steps (A)-(C), said substrate to cause release of oxygen from said metal oxide film.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

DESCRIPTION OF EMBODIMENT

Embodiments that describe the best mode for carrying out the present disclosures are explained next with reference to the drawings.

First Embodiment

Figure 1:
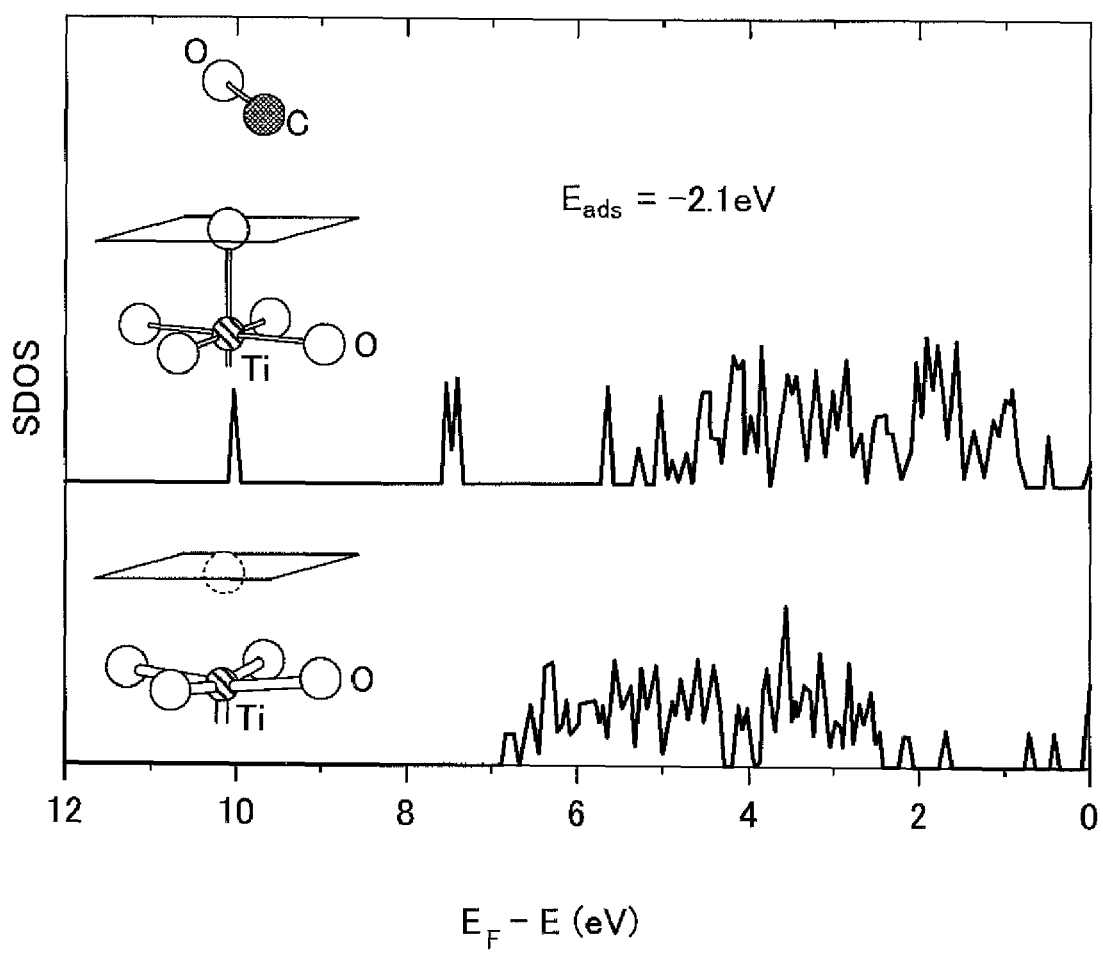
FIG. 1 is a graph representing a surface density of states (SDOS) of a $SrTiO_3$ crystal.

FIG. 1 represents the surface density of states of a $SrTiO_3$ crystal obtained by a first principle calculation. It should be noted that the lower diagram of FIG. 1 represents the surface density of states for the case oxygen defects are formed on the surface of the $SrTiO_3$ crystal and actually represents the surface density states of a valence band formed by the O2p orbital of oxygen at the surface of the $SrTiO_3$ crystal. Hereinafter, the state of the lower diagram of FIG. 1 will be designated as "Initial State".

On the other hand, the upper diagram of FIG. 1 shows the surface density of states for the case the oxygen defect at the surface of the $SrTiO_3$ crystal has captured the oxygen atom dissociated from a $CO_2$ molecule. It should be noted that the illustrated surface density of states includes the contribution of the valence band formed by the O2p orbital and the contribution of the oxygen atoms captured by the oxygen defects. Hereinafter, the upper diagram of FIG. 1 will be designated as "Final State". In FIG. 1, $E_F$ represents the Fermi level and E represents the energy.

The inventor has further calculated the total energy of the $SrTiO_3$ crystal for the "Initial State" and the "Final State" respectively as Ei and Ef from the surface density of states of FIG. 1 by using a density function theory, and it was shown that the value of Ef is smaller than the value of Ei by 2.1 eV (Ef−Ei=−2.1 eV), indicating that a carbon dioxide molecule would undergo dissociation, when the $SrTiO_3$ crystal having the oxygen defects on the surface thereof is exposed to a carbon dioxide gas, as a result of the oxygen atoms being captured by the oxygen defects.

Figure 2:
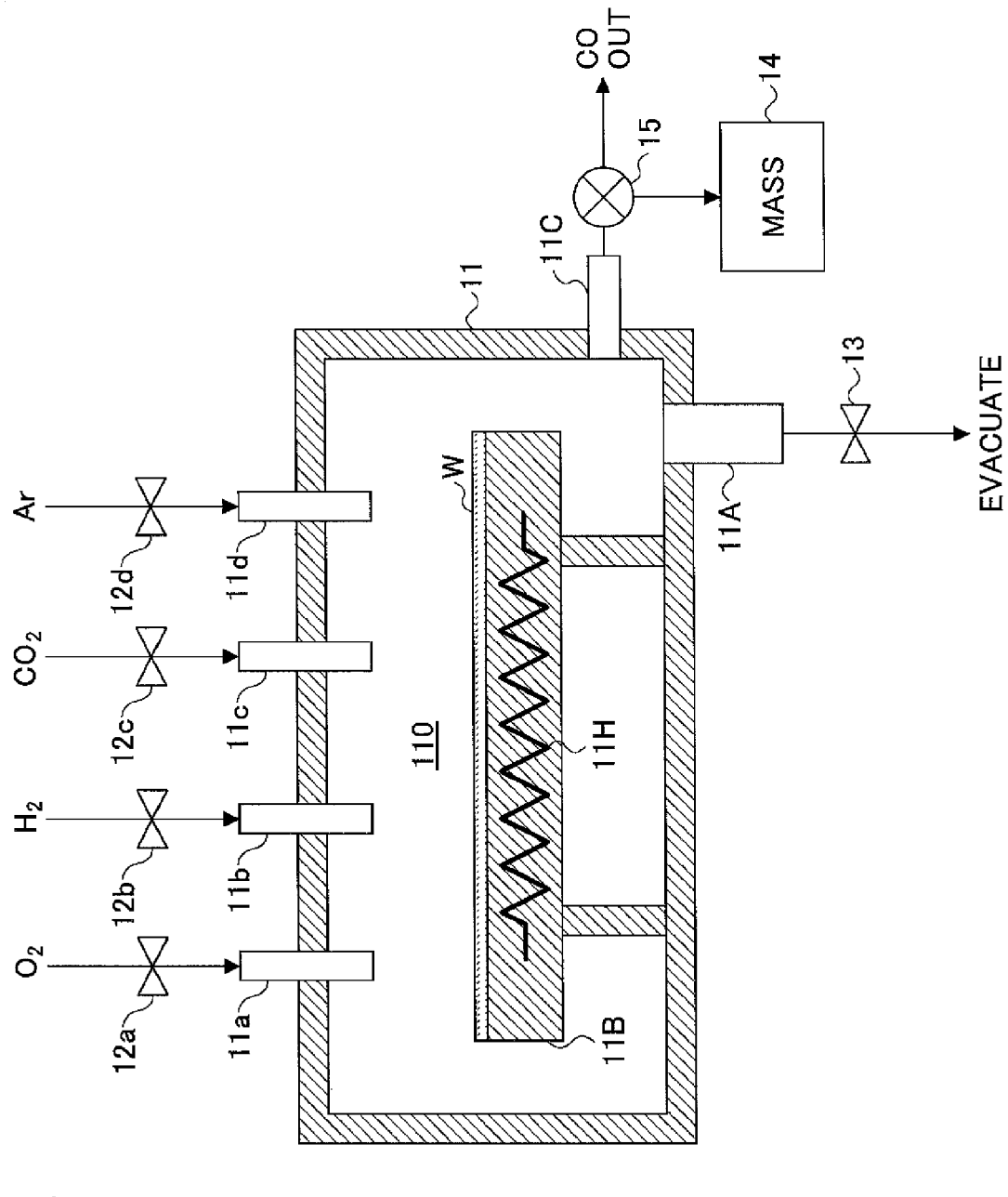
FIG. 2 is a cross-sectional diagram representing the construction of a carbon monoxide gas generator according to a first embodiment.

Thus, the inventor of the present invention has conducted experiments for confirming the foregoing prediction for a $SrTiO_3$ single crystal while using an apparatus 10 shown in FIG. 2 as a carbon monoxide gas generator.

Referring to FIG. 2, the carbon monoxide generator 10 has a processing vessel 11 defining a processing space 110 therein such that the processing space 110 is evacuated from an evacuation port 11A by an evacuation system not illustrated. Further, a substrate stage 11B equipped with a heater 11H is disposed in the processing space 110.

Further, the processing vessel 11 is formed with a first gas supplying port 11a for supplying an oxygen gas via a valve 12a, a second gas supplying port 11b for supplying a hydrogen gas via a valve 12b, a third gas supplying port (source gas supplying port) 11c for supplying a carbon dioxide gas via a valve 12c, and a fourth gas supplying port 11d for supplying an inert purging gas of argon or the like via a valve 12d. Here, it should be noted that the carbon dioxide gas constitutes a source gas that contains carbon dioxide molecules as the source compound molecules.

Further, with the carbon monoxide gas generator 10 of FIG. 2, there is provided a gas outlet port 11C for taking out the gas containing carbon monoxide generated in the processing vessel 11, wherein the gas thus taken out from the gas outlet port 11C and containing the carbon monoxide is forwarded to an external storage tank (not illustrated) or to a mass spectrometer 14 for analysis via a switching valve 15. Here, it should be noted that the carbon monoxide gas constitutes a product gas that contains carbon monoxide molecules as product compound molecules. It should be noted that the product compound is a compound in which one oxygen atom is removed from the source compound molecule.

Figure 3:
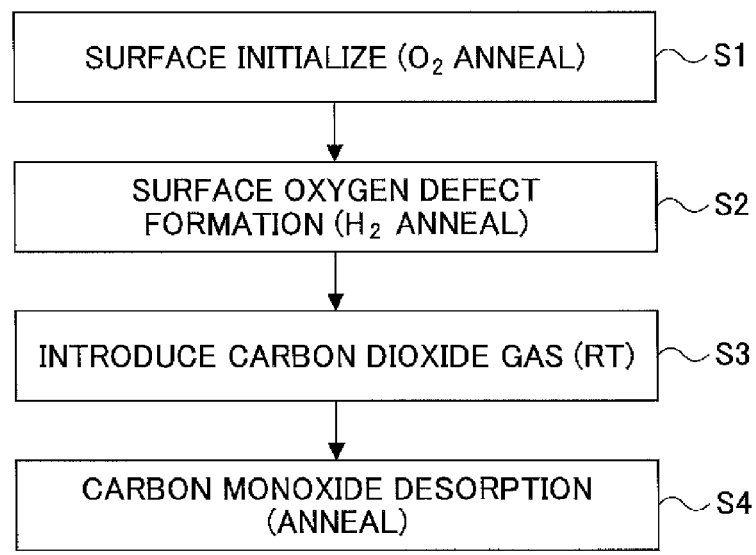
FIG. 3 is a flowchart representing a process of generating a carbon monoxide gas according to the first embodiment that uses the carbon monoxide gas generator of FIG. 2.

FIG. 3 is a flowchart representing the foregoing experiments.

Referring to FIG. 3, a commercially available $SrTiO_3$ single crystal substrate having a (001) principal surface is placed first on the substrate stage 11B as a substrate W and all the valves 12a-12d and the switching valve 15 are closed in the step 1. With this the processing space 110 in the processing vessel 11 is evacuated via the evacuation port 11A and the processing space 110 is depressurized.

Next, the valve 13 is closed and the valve 12a is opened while continuously closing the valves 12b-12d and the switching valve 15. With this the oxygen gas is introduced into the processing space 110 in the processing vessel 11. Further, the heater 11H is activated at the same time, and the substrate W is heated to the temperature of the range of 100° C.-1500° C. With this the oxygen defects existing at the surface of the substrate W are compensated for with the oxygen atoms, and with this, the surface of the substrate W is initialized.

It should be noted that this initialization step may be omitted.

Next, in the step 2, the valves 12a-12c and the switching valve 15 are closed and the argon gas is introduced into the processing space 110 of the processing vessel 11 via the valve 12d and the gas supplying port 11d while evacuating the processing space 110 via the evacuation port 11A. With this, the oxygen gas is purged from the processing space 110. Further, while continuing the evacuation, the valve 12d is closed and the processing space 110 is depressurized.

Further, in the step 2, the valve 12b is opened while continuously closing the valve 13, 12a, 12c and 12d and further the switching valve 15, and the hydrogen gas is introduced into the processing space 110 of the processing vessel 11. Further, the heater 11H is activated at the same time and the substrate W is heated to the temperature of the range of 100° C.-1000° C. With this the surface of the substrate W is reduced with the hydrogen gas and the oxygen defects are formed. As a result of formation of such oxygen defects, the surface of the substrate W is changed to a non-stoichiometric composition represented by using a compositional parameter $\delta$ as $SrTiO_{3-\delta}$. The surface of the substrate W thus obtained was then analyzed by an XPS (X-ray photoelectron spectroscopy) and cathode luminescence spectroscopy, and it was confirmed that there is formed a layer of non-stoichiometric composition characterized by the compositional parameter $\delta$ of 1-2.8 on the surface of the substrate W with a depth of 1 nm-100 nm.

Next, in the step 3, the temperature of the substrate W is lowered to a room temperature, for example, and while continuously closing the valves 12a-12c and further the switching valve 15, the argon gas is introduced into the processing space 110 of the processing vessel 11 via the valve 12d and the gas supplying port 11d while evacuating the processing space 110 via the evacuation port 11A. With this, the hydrogen gas is purged from the processing space 110. Further, by closing the valve 12d and continuing the evacuation, the processing space 110 undergoes depressurization.

Further, in the step 3, the valve 12c is opened in the state the valves 13, 12a and 12b and further the switching valve 15 are closed. Further, the carbon dioxide gas is introduced into the processing space 110 of the processing vessel 11. Further, the entire valves 12a-12c and 13 are closed, and the surface of the substrate W is exposed to the carbon dioxide gas in this state at a temperature of the range from room temperature to 1000° C. for the duration of 1 second to 10000 seconds, preferably 10 seconds to 1000 seconds. With this, the carbon dioxide gas molecules in the carbon dioxide gas undergo dissociation as a result of the oxygen atoms being captured by the oxygen defects and the carbon dioxide gas molecules are converted to carbon monoxide molecules.

Further, in the step 4, the valve 15 is opened and is switched to the mass spectrometer 14. Further, by heating the substrate W in the temperature range from 0° C. to 600° C., the TDS signal represented in FIG. 4 is obtained for the CO gas specie of the mass number of 28.

Figure 4:
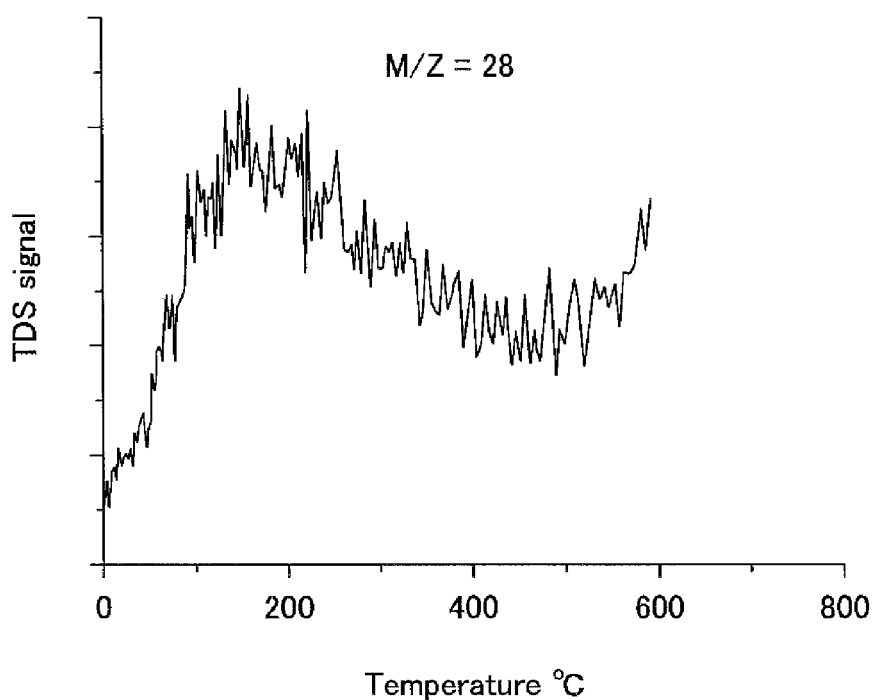
FIG. 4 is a graph representing the results of detection of the carbon monoxide gas generated by the carbon monoxide gas generator of FIG. 2 by a TDS method.

Referring to FIG. 4, it is can be seen that there occurs a release of carbon monoxide with the heating, while this indicates that the substrate W performs the function of dissociating the carbon dioxide gas into a carbon monoxide gas by capturing the oxygen atoms. In FIG. 4, it should be noted that the observed release of the carbon monoxide gas with the heating of the substrate W is attributed to the release of carbon monoxide molecules adsorbed to the surface of the substrate W with the heating of the substrate W.

The carbon monoxide gas thus obtained can be used for various purposes such as a fuel of a fuel cell, preservation of food, and the like.

In the step 4, it is also possible to facilitate the taking out of the carbon monoxide gas from the processing space 110 by opening the valve 12d and introducing the argon gas into the processing space 110 of the processing vessel 11.

While the present embodiment has used the $SrTiO_3$ single crystal of the (001) orientation having the oxygen defects and hence having a non-stoichiometric composition, there is no need with the present embodiment that the substrate W is a single crystal material or the substrate W has a (001) orientation. For example, it is possible to use a polycrystalline layer of $SrTiO_3$ for the substrate W.

Further, it would be evident that the substrate W is not limited to $SrTiO_3$ but it is also possible to use a structure, for the substrate W, in which various metal oxide film of single crystal or polycrystal and having a perovskite structure of which composition is generally represented as $ABO_3$, is formed on the support substrate. For such a metal oxide film, it is possible to use, in addition to $SrTiO_3$ noted before, the compounds such as $BaTiO_3$, $CaTiO_3$, $PbTiO_3$ and further the solid solutions thereof. Further, it should be noted that such a solid solution includes the non-stoichiometric compounds such as $BaSrO_{3-\delta}$, $Ba(Sr,Ti)O_{3-\delta}$, $BaTiO_{3-\delta}$, $SrTiO_{3-\delta}$, $Pb(Zr,Ti)O_{3-\delta}$, $CaTiO_x$, $PbTiO_x$, and the like. Here, x represents a non-stoichiometric composition smaller than 3.

Further, it should be noted that the polycrystalline layer having the oxygen defects on the surface may be formed on a support substrate of an insulating body formed of an oxide, a nitride, an oxynitride, a high dielectric metal oxide, a xerogel, or a combination thereof. Further, it should be noted that such a polysilicon layer may be formed on a support substrate of a semiconductor substrate such as silicon (Si), germanium (Ge), SiGe mixed crystal, or on a group III-V compound semiconductor substrate such as GaAs, InAs, InP, and the like.

Second Embodiment

Figure 5:
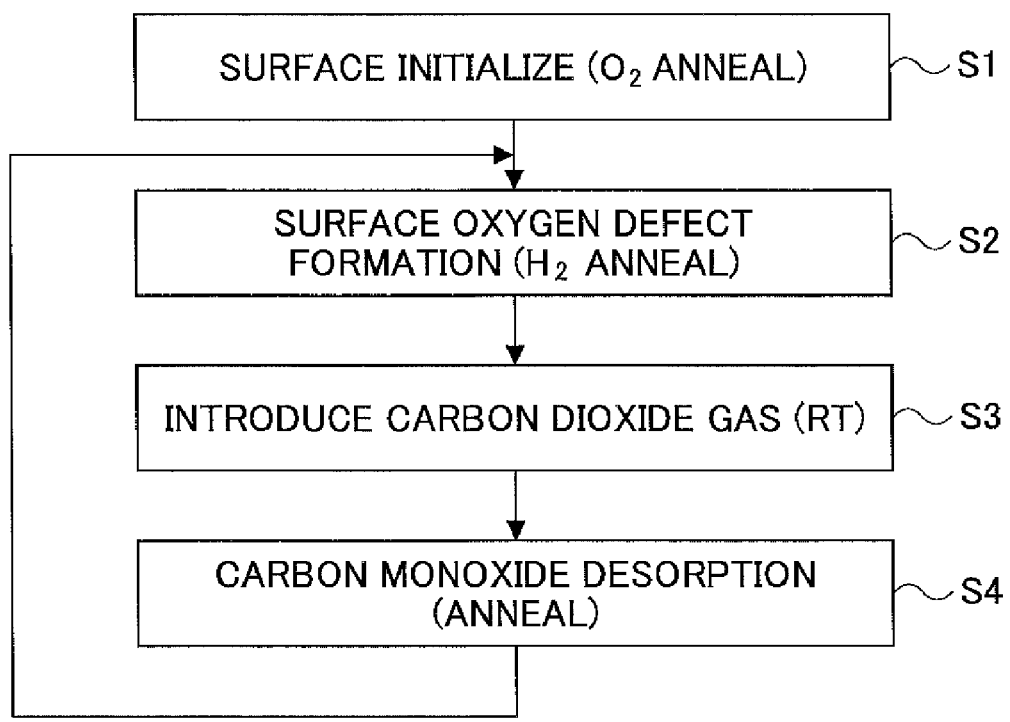
FIG. 5 is a flowchart representing the process of generating a carbon monoxide gas according to a second embodiment that uses the carbon monoxide gas generator of FIG. 2.

FIG. 5 is a flowchart representing a processing method of a carbon dioxide gas according to a second embodiment that again uses the carbon monoxide gas generator 10 of FIG. 2. In FIG. 5, those parts explained before are designated by the same reference numerals and the description thereof will be omitted.

Referring to FIG. 5, the argon gas is introduced into the processing space 110 of the processing vessel 11 in the present embodiment at the time when the carbon dioxide gas is converted to the carbon monoxide gas and the carbon monoxide gas is taken out from the gas outlet port 11C in the state of the step 4 by opening the valve 12d. With this, taking out of the carbon monoxide gas is facilitated and the carbon monoxide gas in the processing space 110 is purged at the same time.

Further, in the step 4, the valve 12d and the switching valve 15 are closed after the purging of the carbon monoxide gas, and the processing space 110 in the processing vessel 11 is depressurized by opening the valve 13.

Further, after the step 4, the process returns to the step 2 in the present embodiment, and the hydrogen gas is introduced into the processing space 110 of the processing vessel 11. With this, the oxygen defects are again formed on the surface of the substrate W.

Thus, by repeating the steps 2-4, the carbon monoxide gas generator 10 of FIG. 2 is operated repeatedly. As a result, it becomes possible to produce the carbon monoxide gas repeatedly from the carbon dioxide gas.

Third Embodiment

Figure 6:
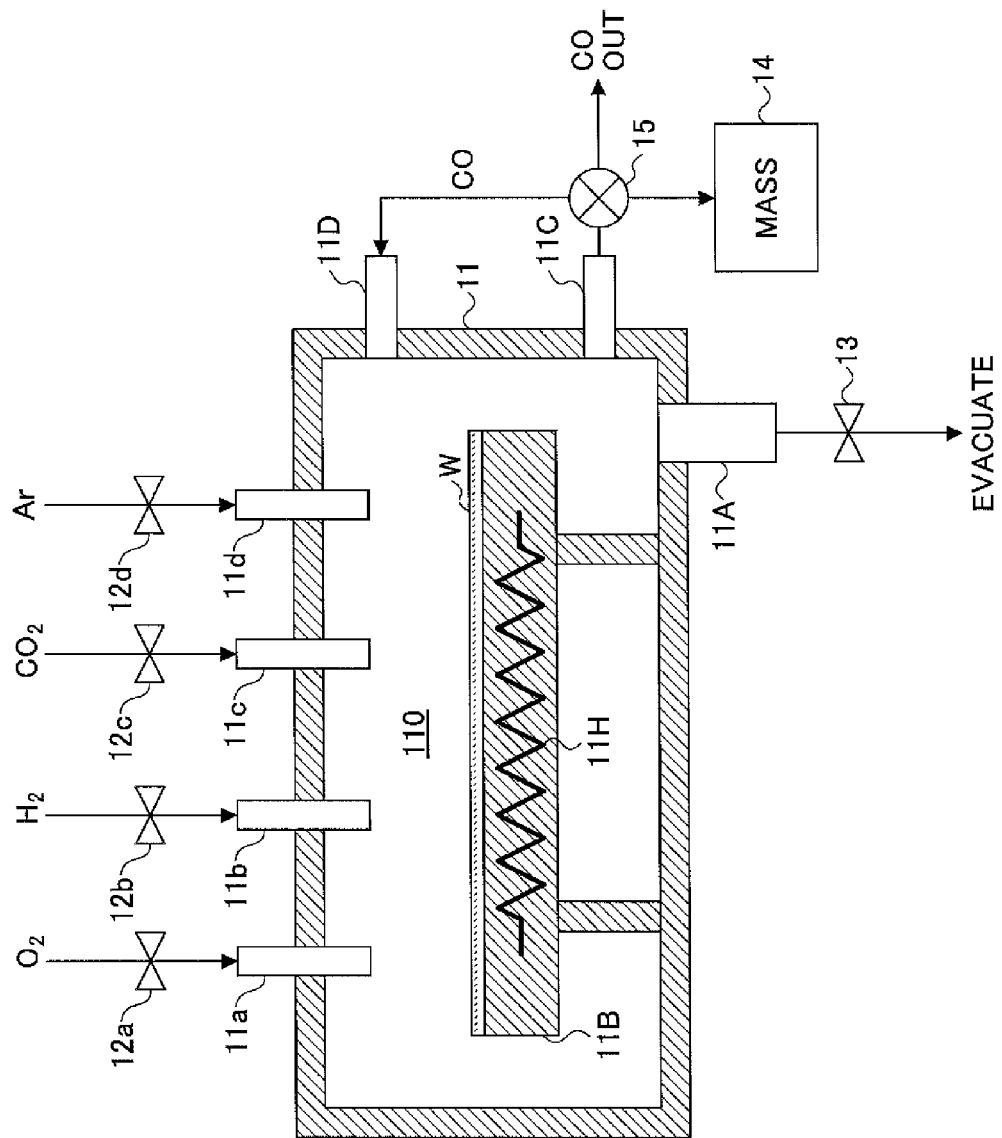
FIG. 6 is a cross-sectional diagram representing the construction of a carbon monoxide gas generator according to a third embodiment.

FIG. 6 shows the construction of a carbon monoxide gas generator 20 according to a third embodiment. In FIG. 6, those parts explained before are designated by the same reference numerals and the description thereof will be omitted.

Referring to FIG. 6, the processing vessel 11 is formed with a gas feedback port 11D. The gas feedback port 11D is supplied with the gas taken out from the gas outlet port 11C and containing therein carbon monoxide or a part of the carbon monoxide via the switching valve 15, wherein the gas feedback port 11D feeds back the same to the processing space 110 of the processing vessel 11.

By feeding back the CO gas to the processing space 110, the present embodiment can reduce the oxygen partial pressure of the processing space 110, while such a feedback facilitates desorption of the oxygen atoms from the surface of the substrate W and thus facilitates the formation of the oxygen defects therein.

Figure 7:
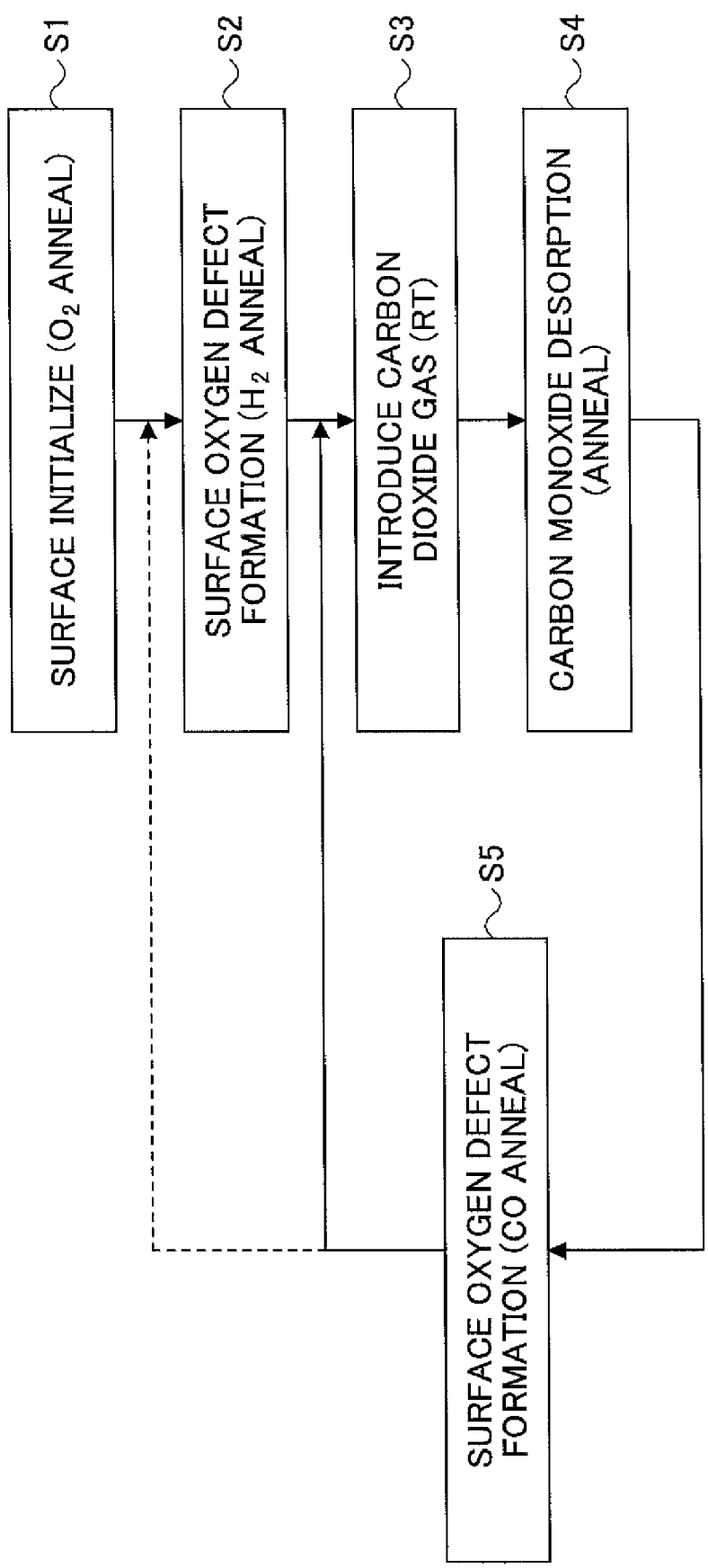
FIG. 7 is a flowchart representing a process of generating a carbon monoxide gas according to a third embodiment that uses the carbon monoxide gas generator of FIG. 6.

FIG. 7 represents the flowchart for generating the carbon monoxide gas conducted by the carbon monoxide gas generator 20 of FIG. 6. In FIG. 7, those steps explained before are designated by the same reference numerals and the description thereof will be omitted.

Referring to FIG. 7, a part of the carbon monoxide gas taken out from the gas outlet port 11C in the step 5 after the step 4 is fed back to the processing space 110 of the processing vessel 11 via the switching valve 15 and the gas feedback port 11D, and the oxygen partial pressure in the processing space 110 of the processing vessel 11 is reduced. At the same time, the heater 11H is activated and the temperature of the substrate W is elevated to the temperature of 100° C.-1000° C. As a result, there occurs again the desorption of the oxygen atoms from the surface of the substrate W in which the number of the oxygen defects has been reduced or the oxygen defects have been eliminated as a result of the capturing of the oxygen atoms in the step 3 conducted previously. Thus, the surface of the substrate W is prepared again for the dissociation of the carbon dioxide gas to be conducted in the next step 3.

Further, by repeating the steps 3-5, or by conducting the oxygen defect formation process of the step 2 by hydrogen gas as necessary as represented by a broken line, it becomes possible to operate the carbon monoxide generator 20 of FIG. 6 repeatedly.

Fourth Embodiment

Figure 8:
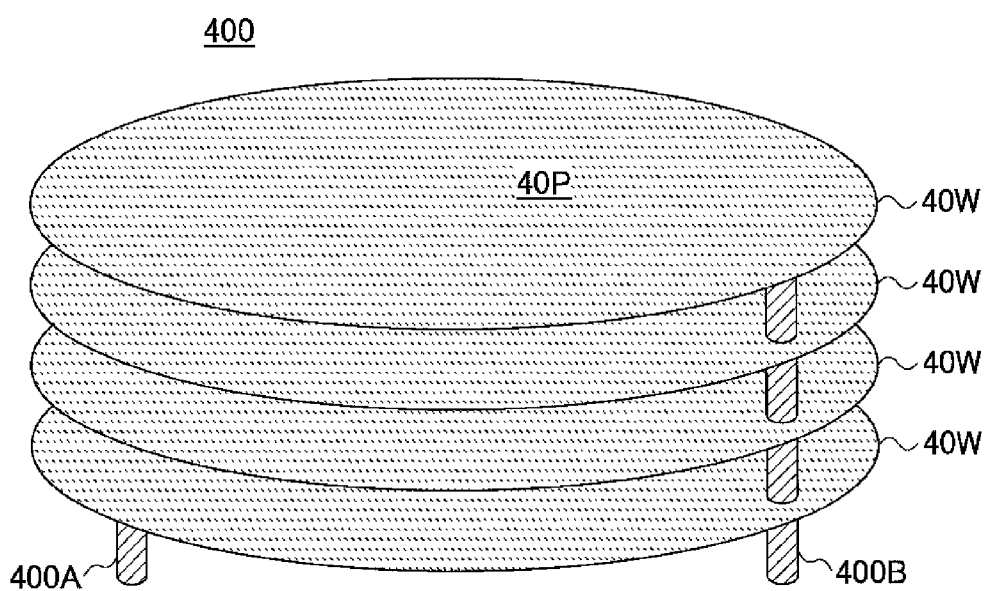
FIG. 8 is an oblique view diagram representing a part of a carbon monoxide gas generator according to a fourth embodiment.

FIG. 8 is an oblique view diagram representing a structure 400 carrying the metal oxide film of the perovskite structure used in the carbon monoxide gas generator 10 of FIG. 2 or in the carbon monoxide gas generator 20 of FIG. 6 in place of the substrate W.

Referring to FIG. 8, the structure 100 has a construction in which a plurality of disk-shaped substrates 40W each having a diameter of 30 cm, for example, and carrying a polycrystalline metal oxide film 40P of the perovskite structure, are stacked with each other with an interval of 0.05 mm-500 mm in the manner that the plurality of disk-shaped substrates 40W are supported by pillars 400A and 400B.

Figure 9:
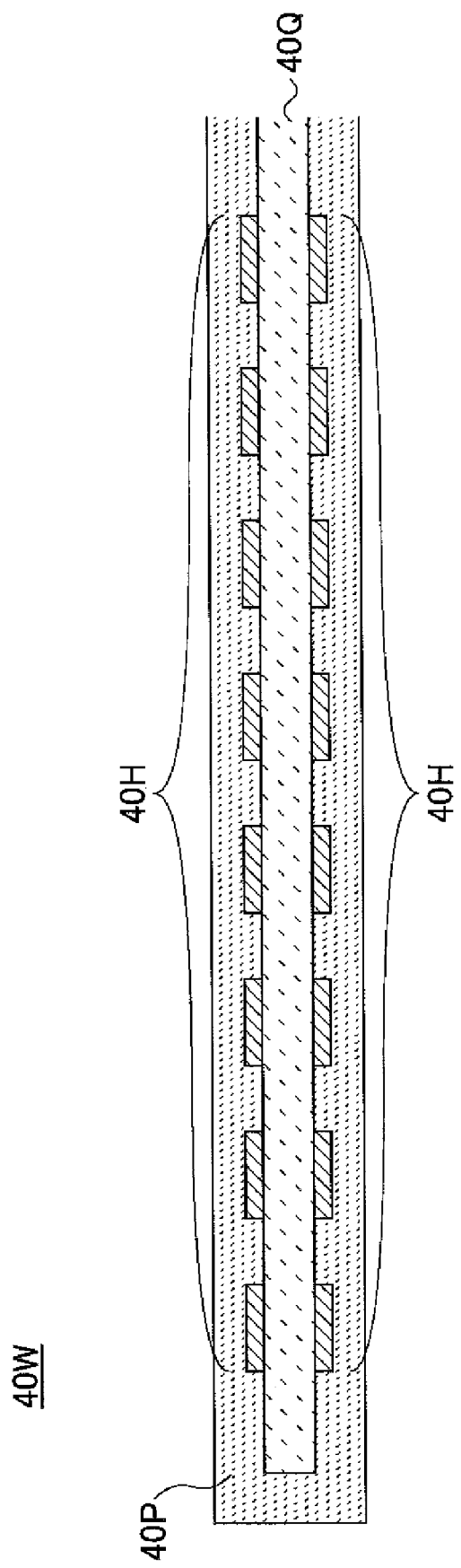
FIG. 9 is a cross-sectional diagram representing a member depicted in FIG. 8.

FIG. 9 is a cross-sectional diagram showing the construction of the disk-shaped substrate 40W shown in FIG. 8.

Referring to FIG. 9, the disk shaped substrate 40W includes a support substrate 40Q formed of any of an oxide such as silicon oxide, a nitride such as silicon nitride, an oxynitride such as silicon oxynitride, a high-dielectric metal oxide such as strontium titanate, barium titanate, PZT, PLZT, or the like, or of a xerogel, wherein the principal surface at the top side and the principal surface at the bottom side are formed with a heater of a conductor pattern 40H in the form of spiral pattern or concentric pattern. The conductor pattern 40H may be formed of a noble metal such as platinum (Pt), rhodium (Rh), platinum-rhodium alloy, or the like, or a refractory metal such as chromium (Cr) or nickel-chromium alloy (NiCr) and can heat the support substrate 40Q uniformly to a temperature range of 100° C.-1000° C., depending on the endurance temperature limit of the support substrate 40Q.

Further, on the foregoing top side principal surface and bottom side principal surface and further on the sidewall surface of the support substrate 40Q, there is formed a metal oxide film 40P of the perovskite structure continuously by a sputtering process, an MOCVD process or a sol-gel process, with a thickness of 0.01 μm to 1000 μm.

Figure 10:
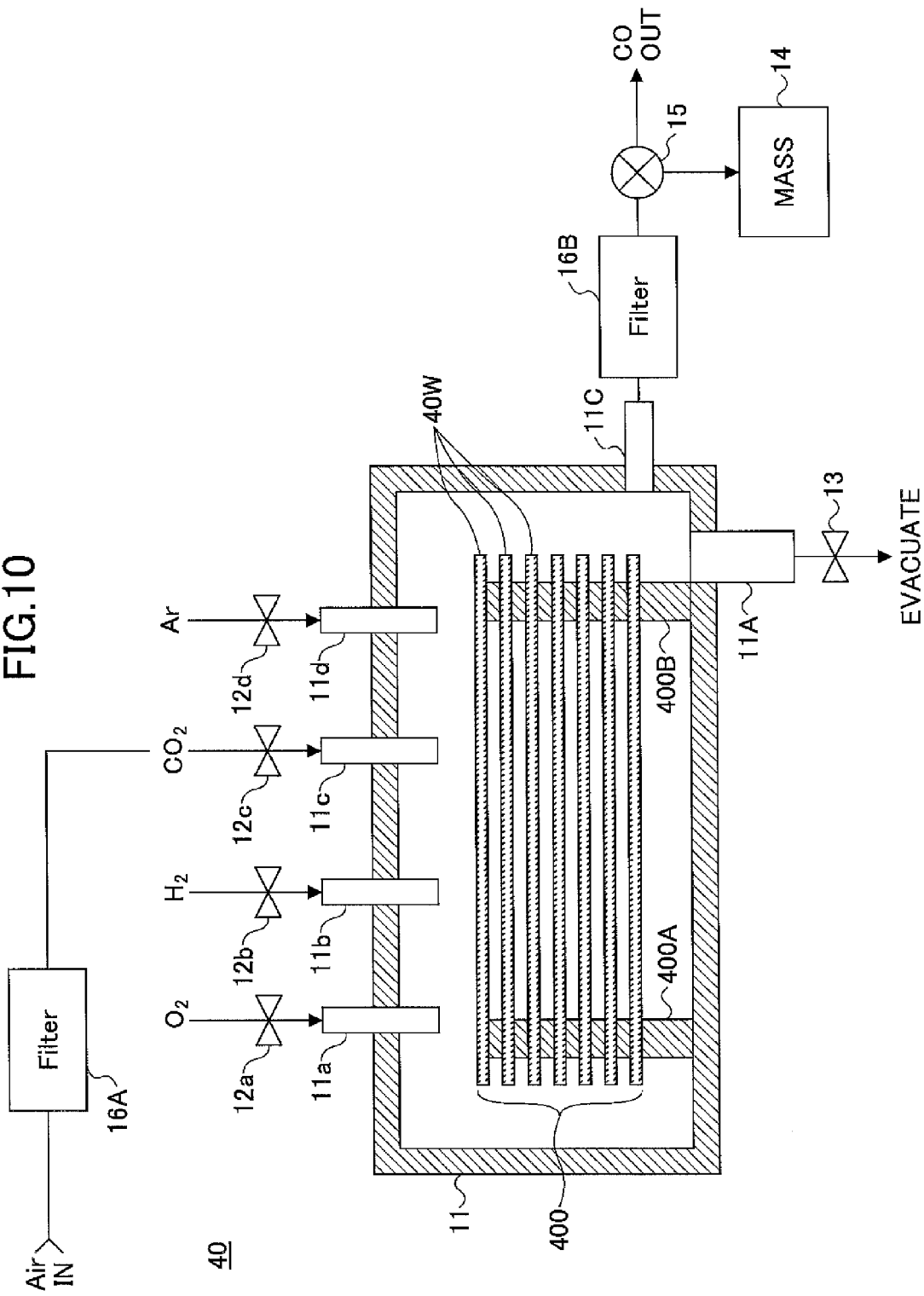
FIG. 10 is a cross-sectional diagram representing the construction of a carbon monoxide gas generator according to the fourth embodiment.

By using the stacked structure 400, there is constructed a carbon monoxide gas generator 40 according to a fourth embodiment as represented in FIG. 10.

In the carbon monoxide gas generator 40 of FIG. 10, it should be noted that there is provided a cold trap filter 16A in the source gas supplying port 11c supplying the carbon dioxide gas so as to pass the carbon dioxide molecules in the air and there is further provided a cold trap filter 16B for passing through the carbon monoxide molecules in the gas taken out from the gas outlet port 11C. By providing the filters 16A and 16B, it becomes possible with the carbon monoxide gas generator 40 to provide a high-purity carbon monoxide gas while using the carbon dioxide gas in the air. For the molecular filter 16A, it is possible to use a commercially available cold trap filter marketed under the trade name of "BOLA Cold Trap" operable in the temperature range of −57° C.<T<0° C. Further, for the cold trap filter 16B, it is possible to use a commercially available molecular filter marketed from KGW Isotherm under the trade name of "Cold Finger Condenser operable in the temperature range of −205° C.<T<−57° C.

Further, the molecular filters 16A and 16B of FIG. 10 can be used also in the apparatus 10 of FIG. 2 or in the apparatus 40 of FIG. 6.

Figure 11A:
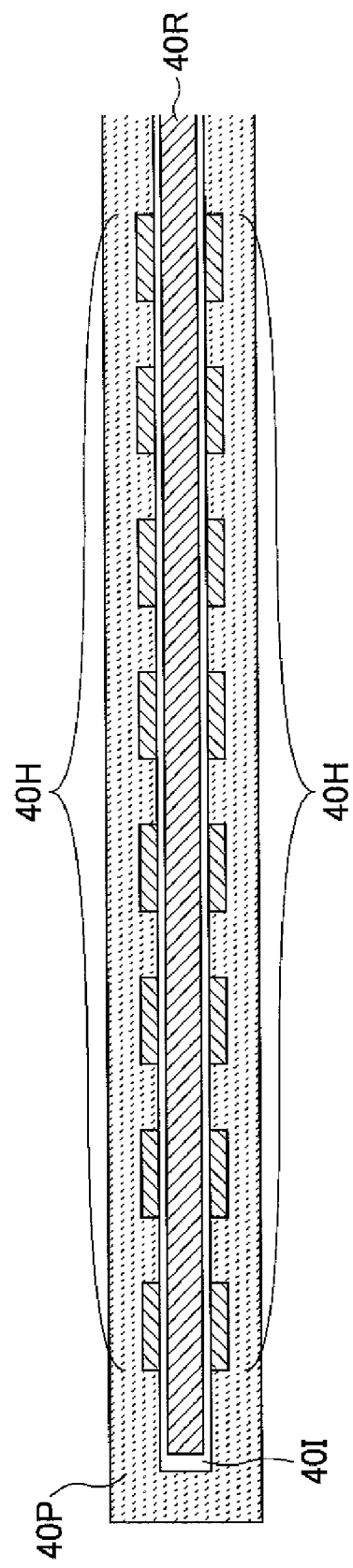
FIG. 11A is a cross-sectional diagram representing a member depicted in FIG. 10.

Further, in the present embodiment, it is also possible to use a support substrate 40R of a semiconductor or metal or metal oxide or metal nitride as represented in the modification of FIG. 11A in place of the support substrate 40Q of insulator represented in FIG. 9. For example, it is possible to use a single crystal substrate of silicon (Si), germanium (Ge) or a SiGe mixed crystal or a single crystal substrate of a group III-V compound semiconductor such as GaAs, InAs, InP, and the like, for such a semiconductor substrate. Further, for such a metal substrate, it is possible to use a refractory metal such as titanium (Ti), tungsten (W), chromium (Cr), molybdenum (Mo), and the like. Further, for such a metal oxide substrate or metal nitride substrate, it is possible to use a metal oxide such as aluminum oxide ($Al_2O_3$) or magnesium oxide (MgO), strontium titanate ($SrTiO_3$), and the like, or a metal nitride such as zirconium nitride (ZrN) or hafnium nitride (HfN).

In the case of forming the support substrate 40R by a semiconductor or metal or a conductive metal nitride, it is preferable to form an insulation film 40I on the surface of the support substrate 40R and form the heater 40H on such an insulation film 40I.

Figure 11B:
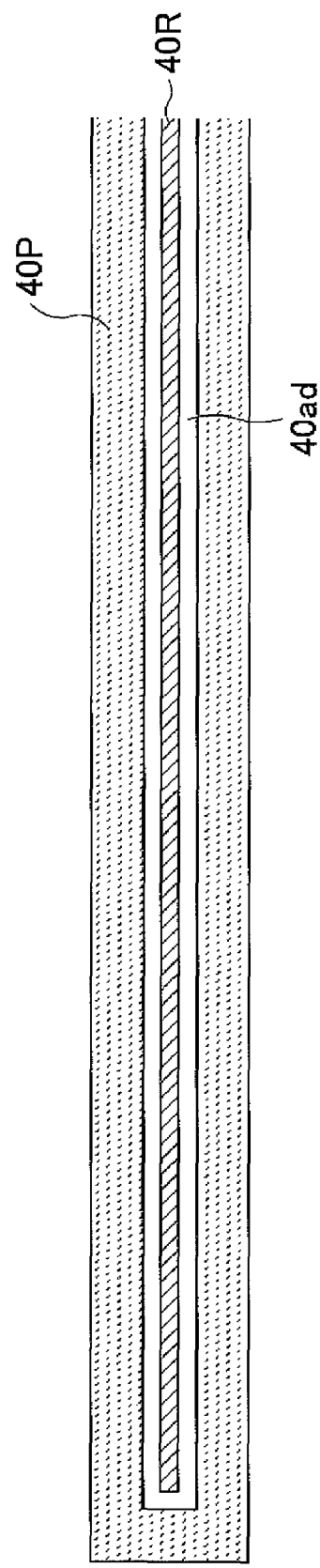
FIG. 11B is a diagram representing a modification of FIG. 11B.

FIG. 11B represents a further modification of FIG. 11A.

In FIG. 11B, a metal substrate is used for the support substrate 40R, wherein an electric current is caused to flow through the metal substrate 40R and the metal substrate 40R is used as the heater.

In the construction of FIG. 11B, there is formed an adhesion layer 40Ad on the surface of the support substrate 40R by a metal or metal oxide or metal nitride.

Figure 12:
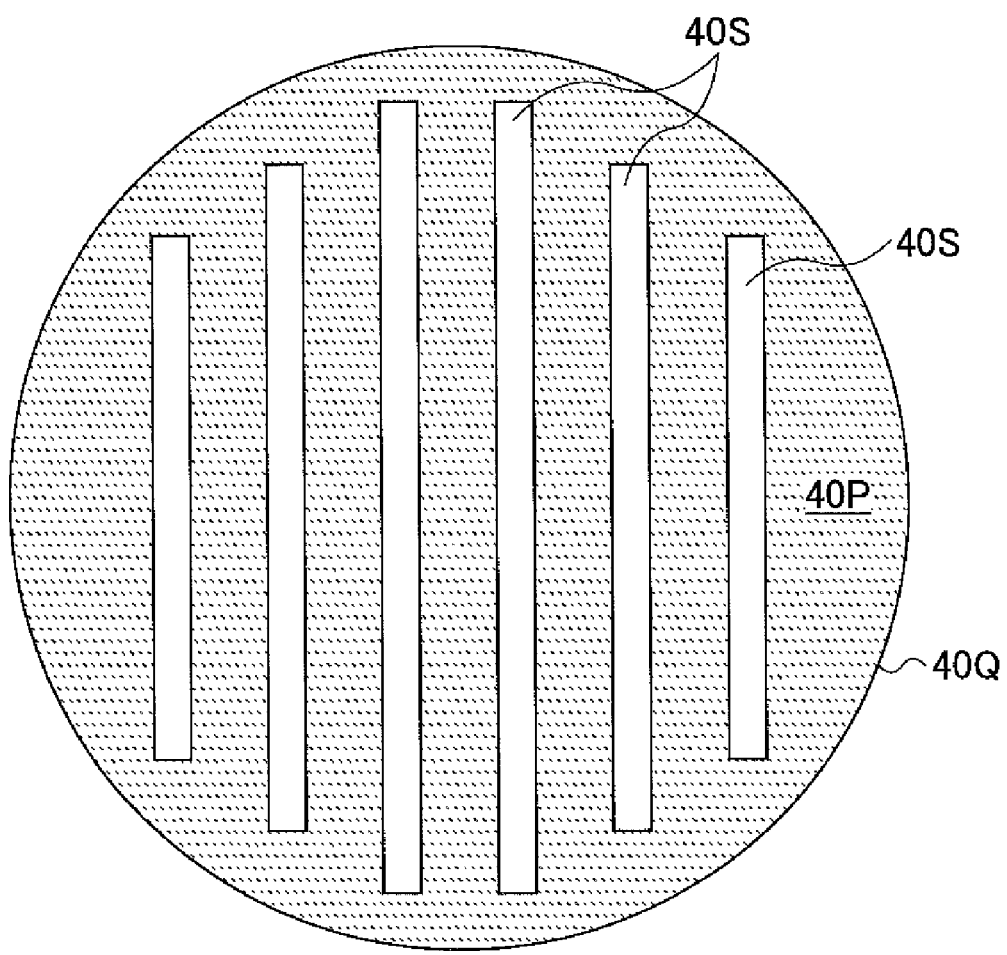
FIG. 12 is a diagram representing a modification of the fourth embodiment.

Further, in the present embodiment, it is also possible to form a slit 40S in the support substrate 40Q as represented in FIG. 12 for facilitating contact of the carbon dioxide gas with the metal oxide film 40P of the perovskite structure.

Fifth Embodiment

While the foregoing embodiments has used a disk-shaped substrate for the support substrate 40Q or 40R, the support substrate 40Q should not be limited to a disk-shaped substrate.

Figure 13:
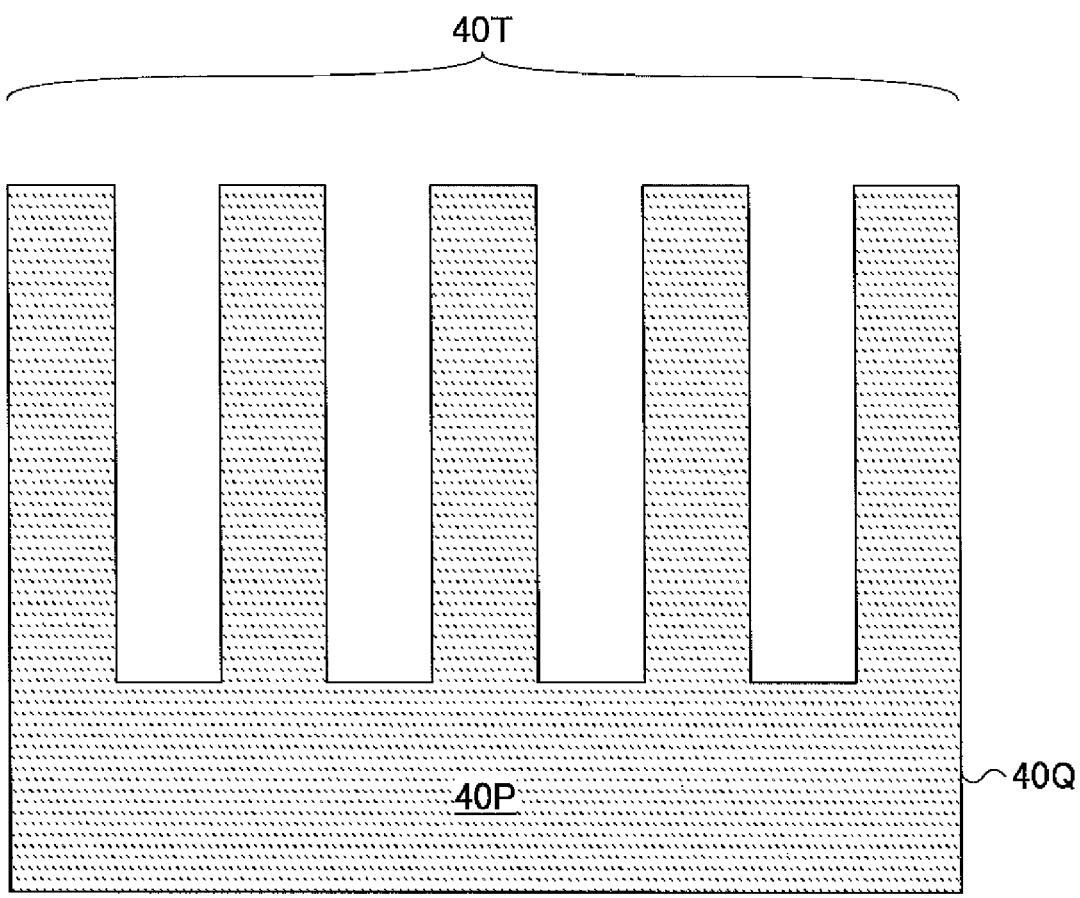
FIG. 13 is a diagram representing a part of a carbon monoxide gas generator according to a fifth embodiment.

For example, FIG. 13 represents an example in which the support substrate 40Q is formed by a generally rectangular-shaped member having comb-teeth part 40T.

By using the substrate having such a comb-teeth part 40T for the substrate 40W in the carbon monoxide gas generator 40 of FIG. 10, it becomes possible to increase the contact area between the carbon dioxide gas and the metal oxide film 40P of the perovskite structure 40P in the step 3 of FIG. 7 further.

Sixth Embodiment

Figure 14:
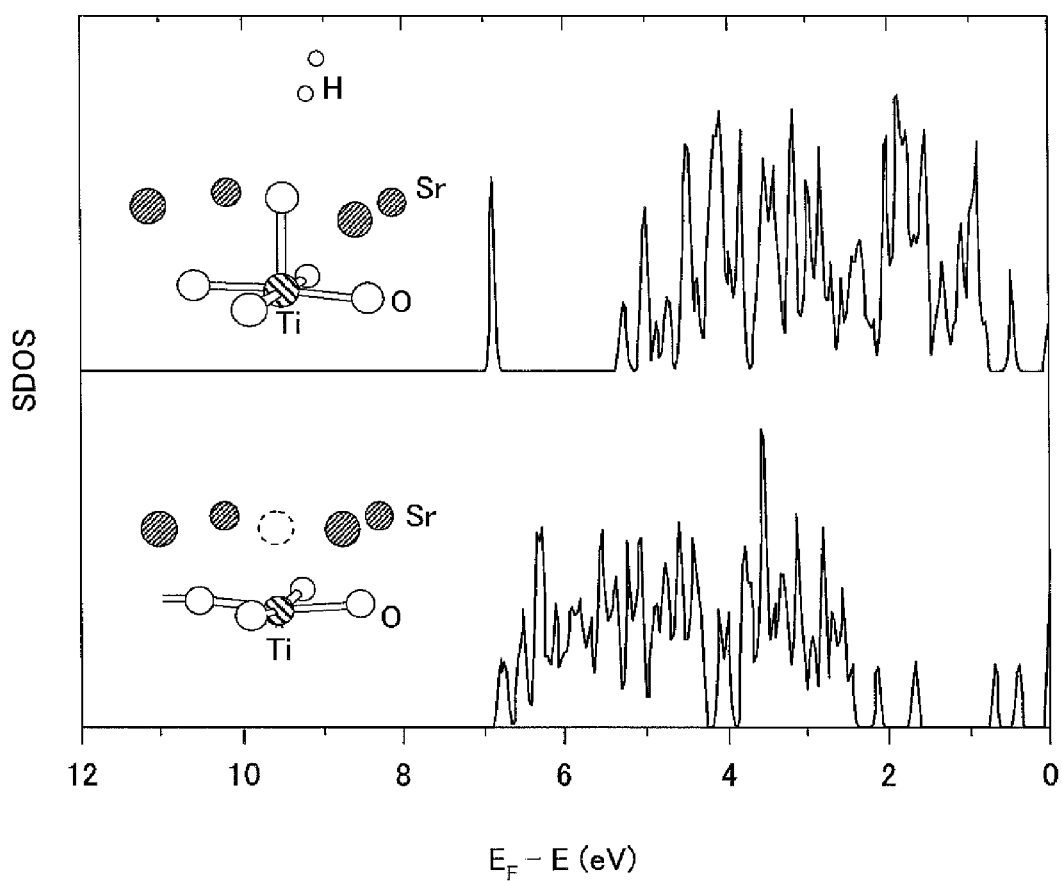
FIG. 14 is a graph representing a surface density of states (SDOS) of a $SrTiO_3$ crystal in relation to the sixth embodiment.

FIG. 14 is a diagram similar to FIG. 1 and represents the surface density of states of a $SrTiO_3$ crystal obtained by a first principle calculation. Similarly to the lower graph of FIG. 1, the lower graph of FIG. 14 represents the surface density of states for the case the oxygen defects are formed on the surface of the $SrTiO_3$ crystal and actually represents the surface density states of a valence band formed by the O2p orbital of oxygen at the surface of the $SrTiO_3$ crystal. In FIG. 14, too, the state of the lower diagram will be designated as "Initial State". It should be noted that the lower graph of FIG. 14 is identical with the lower graph of FIG. 1.

On the other hand, the upper graph of FIG. 14 represents the surface density of states for the case the oxygen defect at the surface of the $SrTiO_3$ crystals has captured an oxygen atom of an $H_2O$ molecule. It should be noted that the surface density of states includes the contribution of the valence band formed by the O2p orbital, the oxygen atoms captured by the oxygen defects and further the OH molecules that are derived from $H_2O$. Hereinafter, the state of the upper graph of FIG. 14 will be designated as "Final State" similarly to the upper graph of FIG. 1. Similarly to FIG. 1, $E_F$ represents a Fermi level and E represents the energy also in FIG. 14.

Further, the total energy of the $SrTiO_3$ crystal has been calculated from the surface density of states of FIG. 14 for the "Initial State" and "Final State" respectively as Ei and Ef by using a density functional theory. As a result of the calculation, it was shown that the value of Ef is smaller than the value of Ei by 2.71 eV (Ef−Ei=−2.71 eV). This indicates that, when such a $SrTiO_3$ crystal having the oxygen defects on the surface is exposed to the water vapor, the water molecules undergo dissociation as a result of the oxygen atoms being captured by the oxygen defects. From this, it is predicted that a hydrogen gas may be produced by cleaving the bond between the oxygen atom and hydrogen atom of the water molecules thus adsorbed to the $SrTiO_3$ crystal as a result of the oxygen atoms being captured by the oxygen defects when the water molecules are heated.

Thus, the inventor of the present invention has conducted experiments for confirming the foregoing prediction for a $SrTiO_3$ single crystal while using the apparatus 10 shown in FIG. 2 as a deuterium gas generator. As the explanation of the apparatus 10 is redundant, the explanation thereof will be omitted.

Figure 15:
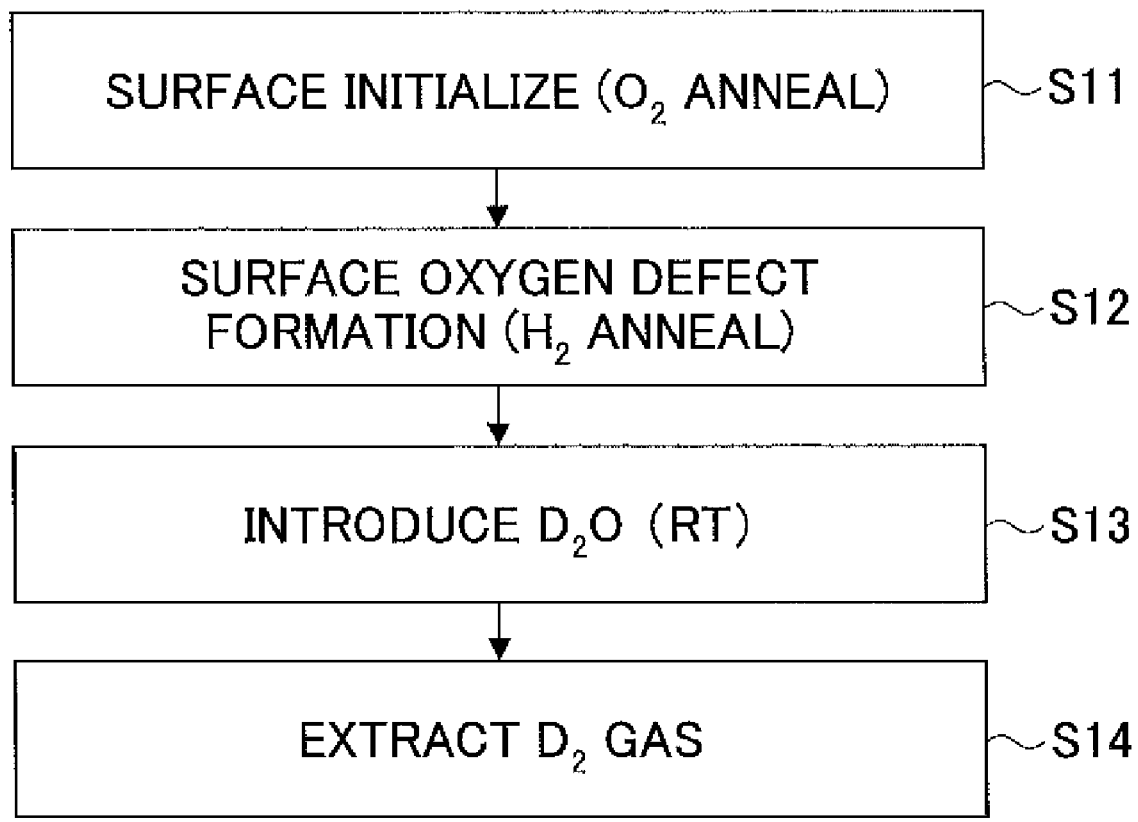
FIG. 15 is a flowchart explaining the sixth embodiment.

FIG. 15 is a flowchart representing the foregoing experiments.

Referring to FIG. 15, a commercially available $SrTiO_3$ single crystal substrate having a (001) principal surface was placed at first on the substrate stage 11B as a substrate W and all the valves 12a-12d and the switching valve 15 were closed in the step 11. With this, the interior of the processing vessel 11 was evacuated via the evacuation port 11A and the processing space 110 was depressurized.

Next, the valve 13 was closed and the valve 12a was opened while continuously closing the valves 12b-12d and the switching valve 15. With this the oxygen gas is introduced into the processing vessel 11. Further, the heater 11H was activated at the same time and the substrate W was heated to the temperature of 100° C.-1500° C. With this the oxygen defects existing at the surface of the substrate W were compensated for with the oxygen atoms, and the surface of the substrate W was initialized.

It should be noted that this initialization step could have been omitted.

Next, in the step 12, the valves 12a-12c and the switching valve 15 were closed and the argon gas was introduced into the processing space 110 of the processing vessel 11 via the valve 12d and the gas supplying port 11d while evacuating the processing space 110 via the evacuation port 11A. With this, the oxygen gas was purged from the processing space 110. Further, while continuing the evacuation, the valve 12d was closed and the processing space 110 was depressurized.

Further, in the step 12, the valve 12b was opened while continuously closing the valve 13, 12a, 12c and 12d and further the switching valve 15, and the hydrogen gas ($H_2$) was introduced into the processing space 110 of the processing vessel 11. Further, the heater 11H was activated at the same time and the substrate W was heated to the temperature of 100° C.-1000° C. With this the surface of the substrate W was reduced with the hydrogen gas and the oxygen defects were formed. As a result of formation of such oxygen defects, the surface of the substrate W was changed to a non-stoichiometric composition represented by using a compositional parameter δ as $SrTiO_{3-\delta}$. The surface of the substrate W thus obtained was analyzed by an XPS (X-ray photoelectron spectroscopy) and cathode luminescence spectroscopy, and it was confirmed that there is formed a layer of non-stoichiometric composition characterized by the compositional parameter δ of 1-2.8 on the surface of the substrate W with a depth of 1 nm-100 nm.

Next, in the step 13, the temperature of the substrate W was lowered to a room temperature, for example, and while continuously closing the valves 12a-12c and the switching valve 15, the argon gas was introduced into the processing space 110 of the processing vessel 11 via the valve 12d and the gas supplying port 11d and while evacuating the interior of the processing space 11 via the evacuation port 11A. With this, the hydrogen gas was purged from the interior of the processing vessel 11. Further, by closing the valve 12d and continuing the evacuation, the processing space 110 of the processing vessel 11 was depressurized.

Further, in the step 13, the valve 12c was opened in the state the valves 13, 12a and 12b and further the switching valve 15 are closed. Further, a deuterium water ($D_2O$) vapor was introduced into the processing space 110 of the processing vessel 11. Further, the entire valves 12a-12c and 13 were closed, and the surface of the substrate W was exposed to the deuterium water vapor in this state at a temperature of the range from room temperature to 1000° C. for the duration of 1 second to 10000 seconds, preferably 10 seconds to 1000 seconds. With this, the deuterium water ($D_2O$) molecules in the deuterium water vapor were converted to deuterium molecules ($D_2$) as a result of the oxygen atom being captured by the oxygen defects. The deuterium water molecules thus formed dwell in the processing space 110 of the processing vessel 11 in the form of a deuterium gas.

Further, in the step 14, the valve 15 was opened and was switched to the mass spectrometer 14. Further, by heating the substrate W in the temperature range of 0° C. to 600° C., the TDS signal represented in FIG. 16 was obtained for the gas species of deuterium water ($D_2O$) having the molecular weight of 20 and the deuterium gas ($D_2$) of the molecular weight of 4. It should be noted that, by using the deuterium water in the experiment of FIG. 16, it becomes possible to avoid the problem that the phenomenon of dissociation of $D_2O$ supplied externally for the experiment is masked by the $H_2O$ or $H_2$ existing in the processing vessel 11 from the beginning, and thus, it becomes easier to observe the phenomenon of dissociation of water vapor by the substrate W.

Figure 16:
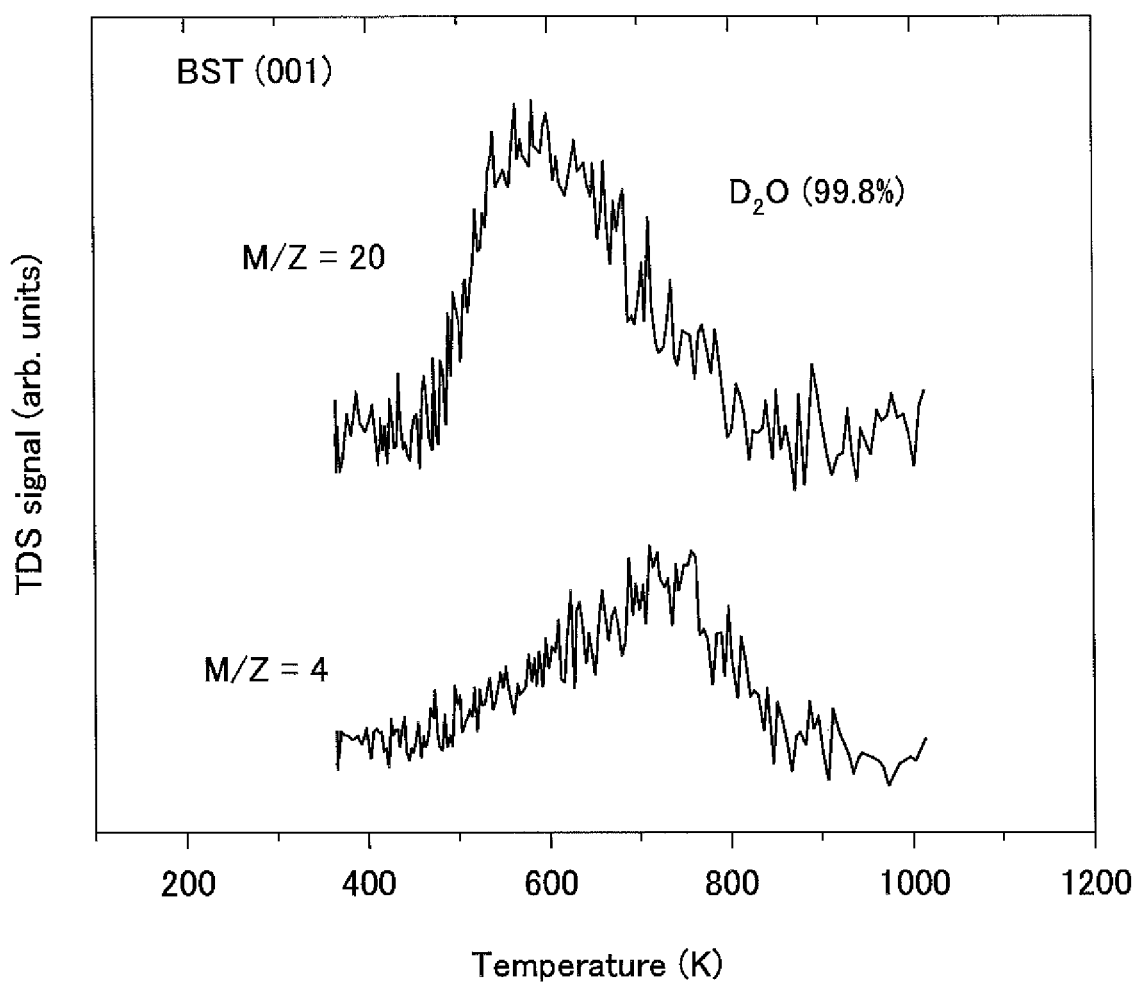
FIG. 16 is a graph representing the results of detection of a hydrogen gas generated in the sixth embodiment by a TDS method.

Referring to FIG. 16, it will be noted that a release of $D_2O$ of the molecular weight (M/Z) of 20 is first observed at the temperature of 200° C.-600° C. with the heating of the substrate, and then the release of $D_2$ of the molecular weight (M/Z) of 4 is observed at the temperature of 300° C.-600° C. Thus, it was confirmed that the substrate W can perform the function of dissociating the $D_2O$ to $D_2$ by capturing the oxygen atom. In FIG. 16, it should be noted that the first release of $D_2O$ with the heating of the substrate W is caused because of the release of the $D_2O$ molecules adsorbed to the inner surface of the processing vessel with the heating of the substrate W. On the other hand, the release of $D_2$ observed at the higher temperature is interpreted as being caused as a result of the dissociation of the $D_2O$ molecules adsorbed to the surface of the substrate W into $D_2$ and oxygen atom as a result of the heating of the substrate W.

Thus, with the experiments of FIG. 16, it was confirmed that it is possible to generate a deuterium gas by causing dissociation in the deuterium water by using the apparatus of FIG. 2. Similarly, it is possible to generate a hydrogen gas by dissociating a water vapor ($H_2O$) by using the apparatus of FIG. 2. The hydrogen gas thus obtained can be used in various applications including fuel for fuel cells, rockets or internal combustion engines and further in various industrial applications.

The present embodiment is applicable to both of ordinary hydrogen of the mass number 1 and represented by the element symbol H and the deuterium of which chemical formula is represented as $^2H$ or D. In the present embodiment, "hydrogen" includes also "deuterium" in addition to ordinary hydrogen. Likewise, in the present embodiment, it should be noted that "water" includes, in addition to $H_2O$, deuterium water $D_2O$ and DHO and the water vapor includes, in addition to a $H_2O$ gas, a gas of deuterium water $D_2O$ and DHO.

In the step 14, it is also possible to facilitate taking out of the hydrogen gas from the processing vessel 11 by opening the valve 12d and introducing the argon gas into the interior of the processing vessel 11.

Similarly to the previous embodiments, it is not necessary that the substrate W is formed of a single crystal or has a (001) orientation also in the present embodiment. For example, it is possible to use a polycrystalline layer of $SrTiO_3$ for the substrate W.

Further, it would be evident also in the present embodiment that the substrate W is not limited to $SrTiO_3$ but it is also possible to use, for the substrate W, a structure in which various metal oxide film of single crystal or polycrystal having a perovskite structure of which composition is generally represented as $ABO_3$ is formed on the support substrate. For such a metal oxide film, it is possible to use, in addition to $SrTiO_3$ noted before, $BaTiO_3$, $CaTiO_3$, $PbTiO_3$ and the solid solutions thereof. Further, it should be noted that such a solid solution includes the non-stoichiometric compounds such as $BaSrO_{3-\delta}$, $Ba(Sr, Ti)O_{3-\delta}$, $BaTiO_{3-\delta}$, $SrTiO_{3-\delta}$, $Pb(Zr, Ti)O_{3-\delta}$, $CaTiO_x$, $PbTiO_x$, and the like.

Further, it should be noted that the polycrystal layer having the oxygen defects on the surface may be formed on a support substrate of an insulating body formed of an oxide, a nitride, an oxynitride, a high dielectric metal oxide, a xerogel, or a combination thereof. Further, it should be noted that such a polysilicon layer may be formed on a support substrate of a semiconductor substrate such as silicon (Si), germanium (Ge), SiGe mixed crystal, or on a group III-V compound semiconductor substrate such as GaAs, InAs, InP, and the like.

Seventh Embodiment

Figure 17:
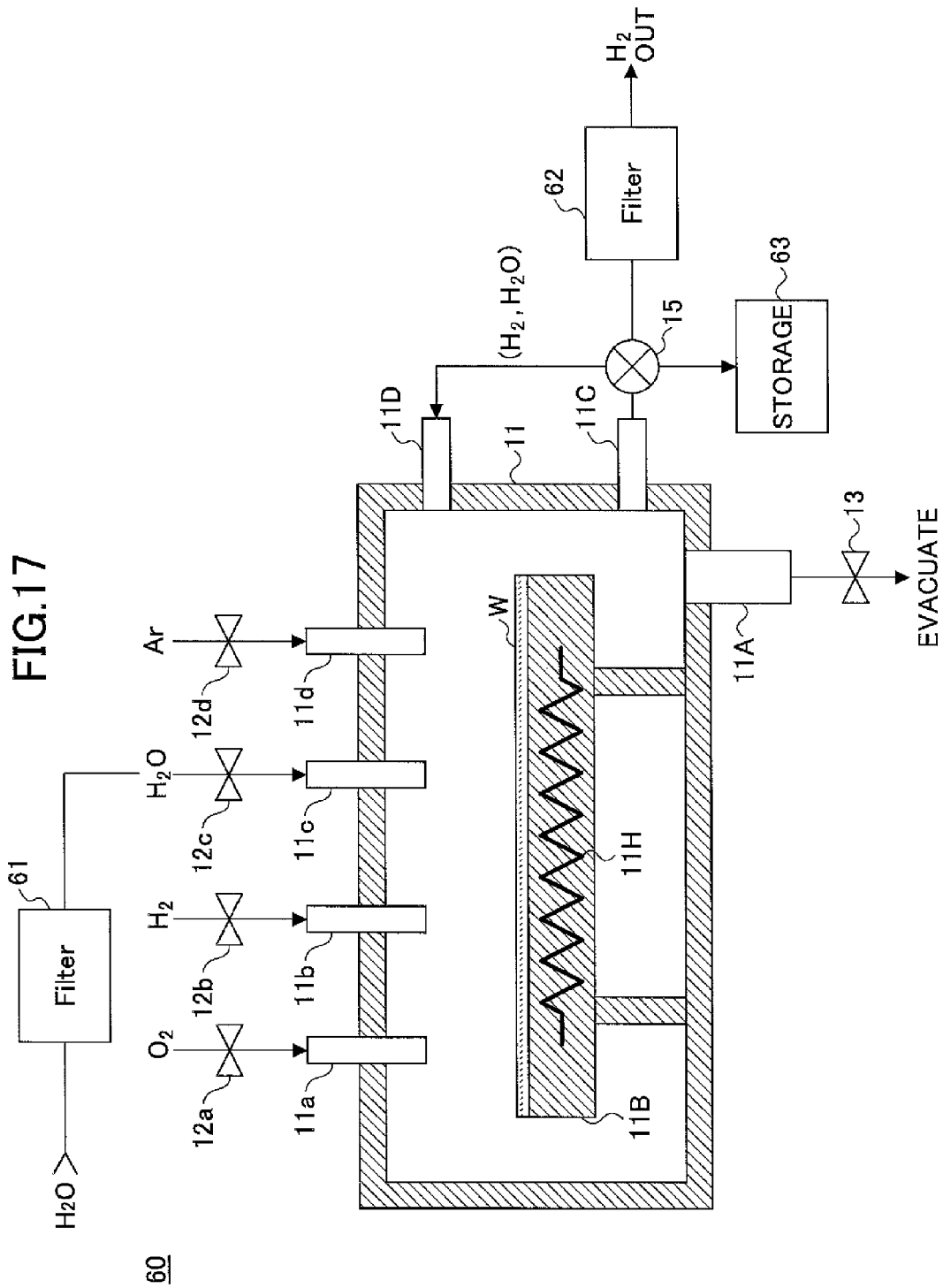
FIG. 17 is a cross-sectional diagram representing the construction of a hydrogen gas generator according to a seventh embodiment.
Figure 18:
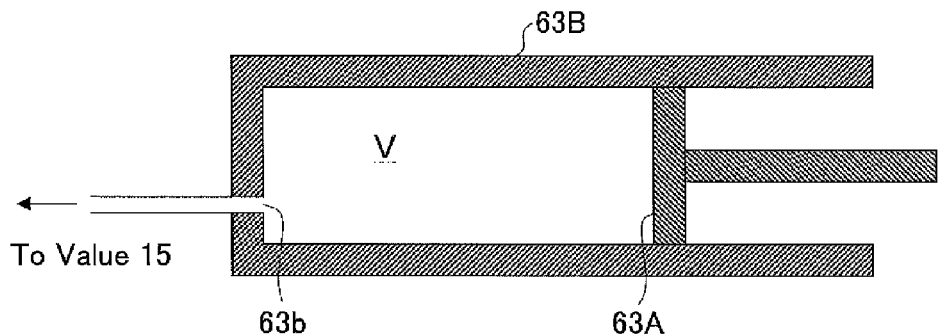
FIG. 18 is a cross-sectional diagram representing a gas storage tank used in the hydrogen gas generator of FIG. 17.

FIG. 17 is a schematic cross-sectional diagram of a hydrogen gas generator 60 according to a seventh embodiment, while FIG. 18 is a flowchart representing the operation of the hydrogen gas generator 60 of FIG. 17. In the FIG. 17, those parts explained before are designated by the same reference numerals and the description thereof will be omitted. While the present embodiment is explained hereinafter for the hydrogen gas generator, it should be noted that the present embodiment is applicable also to the generation of carbon monoxide gas by supplying a carbon dioxide gas. Likewise, the embodiments described heretofore can be used also for the generation of hydrogen gas by supplying a water vapor.

Referring to FIG. 17, the processing space 110 of the processing vessel 11 is supplied with a water vapor in the air passed through the water molecular filter 61 for example via the valve 12c and the source gas supplying port 11c as a source gas, and the water molecules constituting the water vapor are adsorbed to the substrate W as a result of the oxygen atoms in the molecules being captured by the oxygen defects in the substrate W. Here, it should be noted that supply of the oxygen gas in the air to the processing vessel 11 is suppressed by supplying the source gas via the water molecular filter 61. Here, it should be noted that water vapor constitutes the source gas and contains water molecules as the molecules of the source compound.

In this state, the substrate W is heated to the temperature range of 300° C.-600° C. wherein the bond between the oxygen atom and the hydrogen atom of the water molecule is cleaved and the hydrogen gas is obtained by the dissociated hydrogen atoms as explained previously with reference to FIG. 16. Here, it should be noted that hydrogen gas constitutes the product gas and contains hydrogen molecules as the molecules of the product compound. Here, it should be noted that the product compound is a compound in which one oxygen atom is removed from the source compound.

The hydrogen gas thus obtained is stored in a temporary storage tank 63 after being taken out from the processing space 110 of the processing vessel 11 via the gas outlet port 11C and the switching valve 15. Thereby, it should be noted that the gas stored in the storage tank 63 takes the form of a mixed gas of the hydrogen gas and the water vapor. As explained with reference to FIG. 16, the water vapor causes desorption from the substrate W at the same time when the substrate W is heated to the foregoing temperature range.

FIG. 18 depicts a schematic construction of the storage tank 63.

Referring to FIG. 18, the storage tank 63 includes a piston 63A and a cylinder 63B wherein the cylinder 65B is formed with a port 63b for connection to the switching valve 15. Thus, by driving the piston 63A in the cylinder 63B by pneumatic pressure or oil pressure, the internal volume V of the storage tank 63 is changed between a minimum value Vmin and a maximum value Vmax. Thereby, it is preferable to design such that the magnitude ΔV of the change of the volume V is larger than the volume of the processing vessel 11.

Thus, when to store the hydrogen gas to the storage tank 63, the gas outlet port 11C is connected to the storage tank 63 via the valve 15 and the volume V is increased by driving the piston 63A in this state. With this, the atmosphere in the processing vessel 11 containing the hydrogen gas and the water vapor is drawn into the cylinder 63B.

Thereafter, the valve 15 is closed and the processing vessel 11 is disconnected from the storage tank 63. Further, the valve 13 is opened and the processing space 110 of the processing vessel 11 is evacuated and is depressurized. Further, the heater 11H is activated and the substrate W is heated to the temperature of 100° C.-1000° C. With this, the oxygen atoms filling the oxygen defects at the surface of the substrate W are desorbed and are expelled to the outside of the system. With this, the initial oxygen defects are resumed in the substrate W. Here, it is also possible to introduce an inert gas such as Ar into the processing vessel 11 for facilitating purging.

Next, the switching valve 15 is operated and the storage tank 63 is connected to the processing vessel via the gas feedback port 11D of the processing vessel 11. With this, the gas inside the storage tank is fed back to the processing space 110 of the processing vessel 11.

The gas thus fed back contains hydrogen and water vapor, wherein the water vapor is adsorbed to the substrate W as a result of the oxygen atoms thereof being captured by the oxygen defects of the substrate W similarly to the previous case.

Thus, by repeating the foregoing processes, the hydrogen gas is released further into the processing space 110 of the processing vessel 11 as a result of the dissociation of the water vapor, and there occurs an increase of hydrogen gas concentration in the processing space 110 of the processing vessel.

It should be noted that the operation of the switching valve 15 is controlled by a control unit not illustrated such as a computer.

The hydrogen gas thus concentrated is taken out to the outside from the switching valve 15 via the hydrogen molecular filter 62. For the hydrogen molecular filter 62, it is possible to use carbon nanotubes. Further, for the water molecular filter 61, it is possible to use a cold trap.

Figure 19:
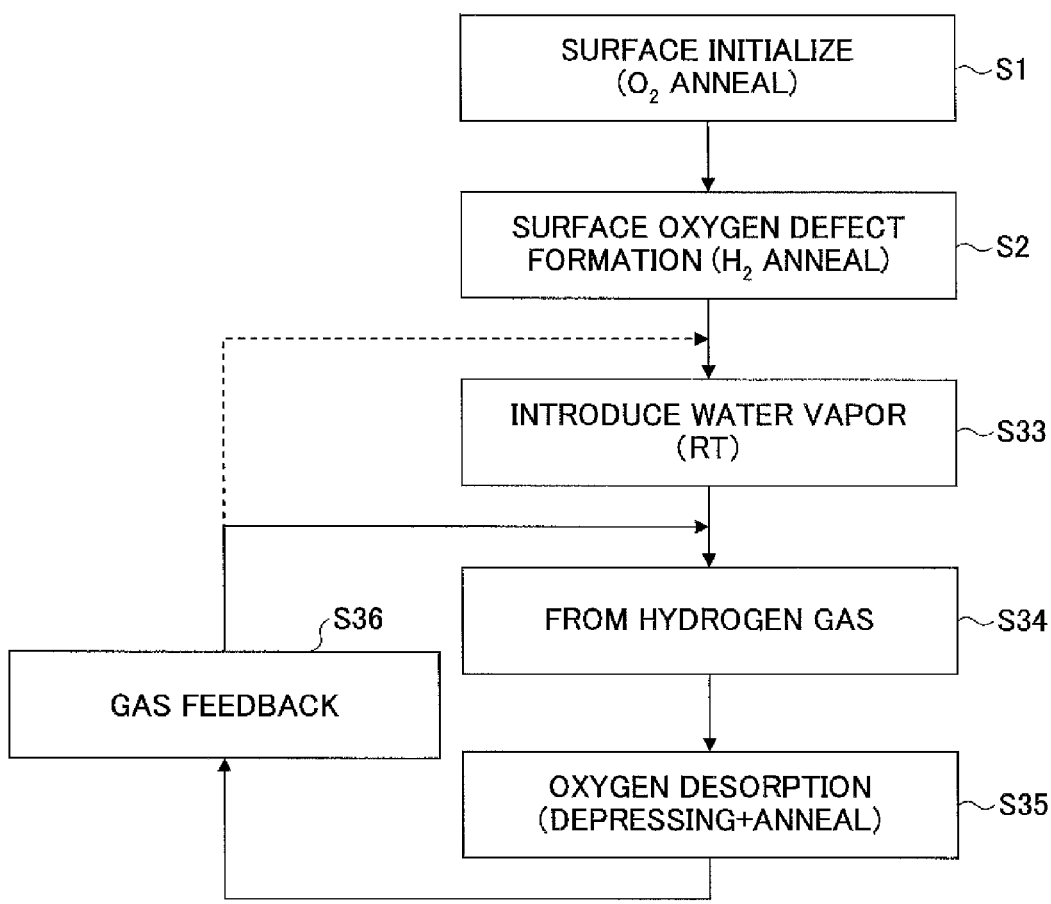
FIG. 19 is a cross-sectional diagram representing a process of producing a hydrogen gas according to the seventh embodiment.

FIG. 19 represents a flowchart of the hydrogen gas generation conducted by using the hydrogen gas generator 60 of FIG. 17 while FIG. 20 represents the switching operation of the valve 15 corresponding to the flowchart of FIG. 19. In FIG. 19, those steps explained before are designated by the same reference numerals and the description thereof will be omitted.

Referring to FIG. 19, the water vapor is introduced into the processing space 110 of the processing vessel 11 in a step 33 after the step 2 in the state that the substrate is held at the room temperature, and adsorption of the water vapor molecules upon the substrate W is attained as a result of the oxygen atoms of the water molecules being captured by the oxygen defects according to the mechanism explained already.

Further, in the step 34, the temperature of the substrate W is elevated to the temperature of 600K-800K by driving the heater 11H, and the hydrogen gas is formed in the processing space 110 of the processing vessel 11 as a result of the dissociation of the water molecules.

in this step 34, the atmosphere in the processing space 110 of the processing vessel 11 containing the hydrogen gas is forwarded to the storage tank 63 via the switching valve 15.

Further, in the step 35, the processing space 110 of the processing vessel 11 is evacuated and is depressurized via the evacuation port 11A and the valve 13. Further, the heater 11H is activated and the substrate W is heated to the temperature of 100° C.-1000° C. With this, the oxygen partial pressure of the processing vessel 110 is lowered and the oxygen atoms filing the oxygen defect at the surface of the substrate W are released and are expelled to the outside of the system in the form of oxygen gas. Thus, in the step 35, oxygen is purged from the processing space 110, and as a result, there are again formed the oxygen defects at the surface of the substrate W. Thus, the surface of the substrate W is conditioned in preparation for the hydrogen gas generation process in the next step 34.

Figure 20A:
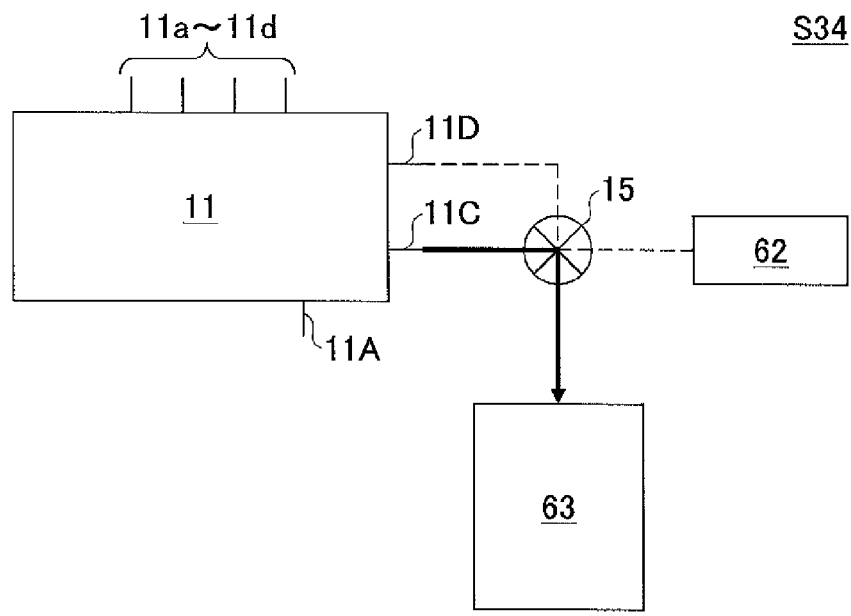
FIGS. 20A-20D are diagrams for explaining the switching of gas passage in the hydrogen gas generator of FIG. 17 corresponding to the flowchart of FIG. 19.
Figure 20B:
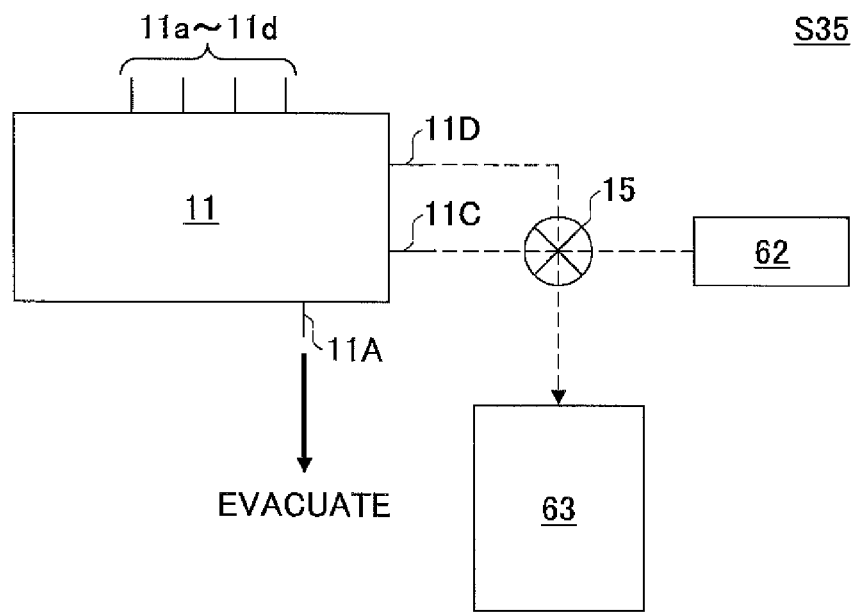

As represented in FIG. 20B, the switching valve 15 disconnects the storage tank 63 and the filter from the processing vessel 11 in the step 35, and thus, there is no risk that the gas in the storage tank flows back to the processing vessel in the step 35 and is evacuated from the evacuation port 11A.

In this step 35, it is also possible to introduce an inert gas of Ar, or the like, into the processing space 110 of the processing vessel 11 from the valve 12d and the port 11d for facilitating the foregoing oxygen purging.

Figure 20C:
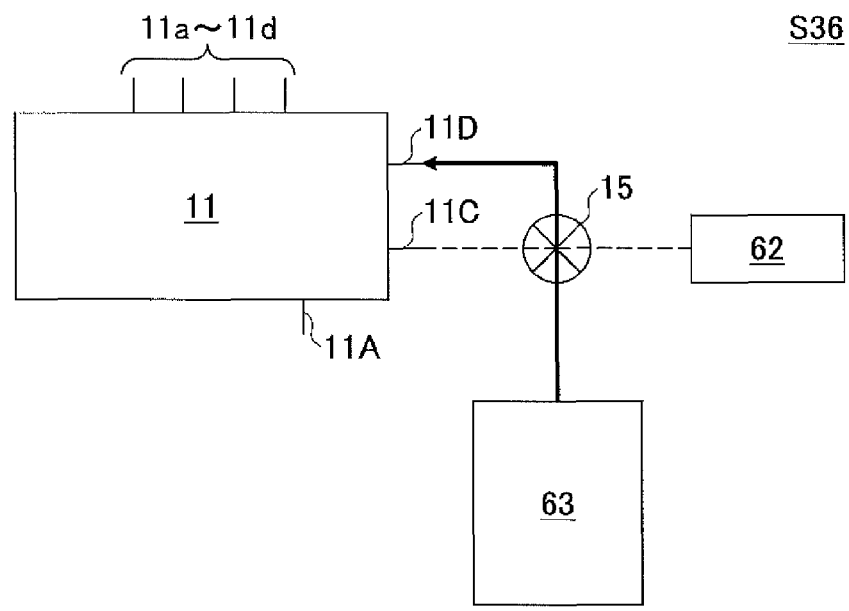

After the step 35, the mixed gas of the hydrogen gas and the water vapor taken out from the gas outlet port 11C is fed back to the processing space 110 of the processing vessel 11 via the switching valve 15 and the gas feedback port 11D as represented in FIG. 20C.

Further, by repeating the steps 33-35, it becomes possible to operate the hydrogen gas generator 60 of FIG. 17 repeatedly.

Figure 20D:
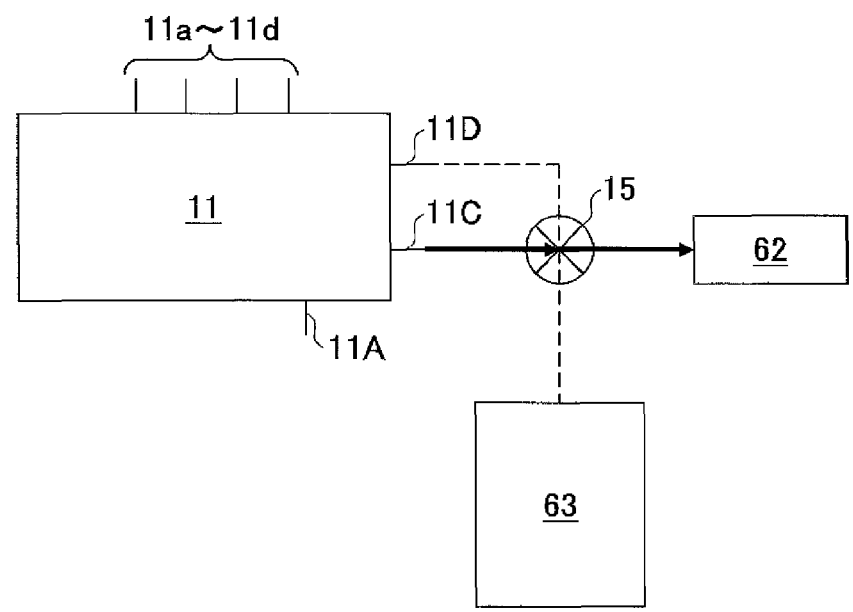

Finally, then the concentration of the hydrogen gas in the atmosphere of the processing space 110 of the processing vessel 11 has increased sufficiently, the valve 15 causes the gas in the processing vessel 11 to flow to the filter 62 as represented in FIG. 20D, and a high-purity hydrogen gas is obtained form the filter 62.

In the present embodiment, too, it is possible to use the construction explained with reference to FIGS. 8, 11A, 11B or FIGS. 12 and 13 for the substrate W.

In the flowchart of FIG. 19, it is also possible to return to the step 33 as represented by a broken line after the feedback process of the step 36 and introduce the water vapor into the processing space 110 of the processing vessel 11.

In the hydrogen gas generator 60 of FIG. 17, it is evident that the hydrogen gas generator of FIG. 17 can be used also as a carbon monoxide gas generator by replacing the filter 61 with the filter 16A explained with reference to FIG. 10 and by replacing the filter 62 with the filter 16B explained with reference to FIG. 10.

The gas generator includes the metal oxide film of perovskite structure containing oxygen defects, and because of this, the carbon dioxide gas or water molecules introduced into the processing vessel have the oxygen atoms in the molecules captured by the oxygen defects in the metal oxide film and cause dissociation into carbon monoxide molecules or hydrogen molecules.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A gas generator comprising:
   a processing vessel defining a processing space therein and holding a support body in said processing vessel;
   an evacuation system coupled to said processing vessel and evacuating said processing space;
   a metal oxide film of a perovskite structure formed on said support body, said metal oxide film containing oxygen defects;
   a source gas supplying port configured to supply a source gas containing molecules of a source compound of carbon dioxide or water into said processing space;
   a gas outlet port configured to extract a product gas containing molecules of a product compound in which oxygen atoms are removed from said source compound; and
   a heating part configured to heat said support body.

2. The gas generator as claimed in claim 1, further comprising:
   an inlet side filter provided to said processing vessel and configured to supply said source gas to said processing space from an outside of said processing vessel; and
   an outlet side filter provided to said processing vessel, said outlet side filter being configured to purify said product gas obtained from said gas outlet port and to take out said product compound.

3. The gas generator as claimed in claim 1, wherein said processing vessel is further provided with a feedback port configured to return said product gas obtained from said gas outlet port to said processing vessel.

4. The gas generator as claimed in claim 1, wherein said metal oxide film has a composition generally represented with a compositional parameter δ as $ABO_{3-\delta}$, wherein said compositional parameter δ takes a value of 1 or more but less than 2.8.

5. The gas generator as claimed in claim 4, wherein said metal oxide film is selected from a group consisting of $BaSrO_{3-\delta}$, $Ba(Sr,Ti)O_{3-\delta}$, $BaTiO_{3-\delta}$, $SrTiO_{3-\delta}$, $Pb(Zr,Ti)O_{3-\delta}$, $CaTiO_x$, and $PbTiO_x$.

6. The gas generator as claimed in claim 1, wherein said support body comprises an insulator selected from a group consisting of an oxide, a nitride, an oxynitride, a high-dielectric metal oxide, and a xerogel.

7. The gas generator as claimed in claim 1, wherein said support body comprises silicon, germanium, a silicon-germanium mixed crystal, or a group III-V compound semiconductor.

8. The gas generator as claimed in claim 1, wherein said support body comprises a plurality of support members, wherein each support member of said plurality of support members carries said metal oxide film.

9. The gas generator as claimed in claim 8, wherein said plurality of support members are stacked vertically with separation from each other.

10. The gas generator as claimed in claim 9, wherein said plurality of support members forms a comb-shaped pattern.

11. The gas generator as claimed in claim 1, further comprising a switching valve connected to said gas outlet port and configured to switch a path of said product gas, a storage tank connected to said switching valve and configured to store said product gas, an outlet side filter connected to said switching valve and configured to purify said product gas obtained from said gas outlet port and to take out said product compound, and a feedback port connected to said switching valve and is configured to return said product gas obtained from gas outlet port to said processing vessel.

12. The gas generator as claimed in claim 11, wherein said switching valve is configured to switch a state thereof between a first state in which said product gas is supplied to said storage tank, a second state in which said gas outlet port, said feedback port, said storage tank and said outlet side filter are disconnected with each other, a third state in which said storage tank is connected to said feedback port, and a fourth state in which said gas outlet port is connected to said outlet side filter.

13. The gas generator as claimed in claim 11, wherein said source compound comprises a water molecule, said source gas comprises a water vapor, said product compound comprises a hydrogen molecule and said product gas comprises a hydrogen gas.

14. The gas generator as claimed in claim 11, wherein said source compound comprises a carbon dioxide molecule, said source gas comprises a carbon dioxide gas, said product compound comprises a carbon monoxide molecule and said product gas comprises a carbon monoxide gas.

15. A gas generation method using a gas generator, said gas generator comprising: a processing vessel defining a processing space and holding a support body in said processing space; a metal oxide film of a perovskite structure containing oxygen defects formed on said support body; a source gas supplying port provided to said processing vessel and configured to supply a source gas containing molecules of a source compound into said processing space from an outside of said processing vessel; and a gas outlet port provided to said processing vessel and configured to take out a product gas containing molecules of a product compound in which oxygen atoms are removed from said source compound; and a heating part configured to heat said support body, said method comprising:
   (A) evacuating said processing space;
   (B) introducing said source gas into said processing space via said source gas supplying port and causing said source compound to dissociate to said product compound by said metal oxide film;
   (C) taking out said product gas from said processing space to an outside of said processing vessel via said gas outlet port; and
   (D) causing, after said (A)-(C), said metal oxide film to release oxygen by heating said substrate.

16. The method as claimed in claim 15, wherein said (B) is conducted in a temperature range from a room temperature to 1000° C.

17. The method as claimed in claim 15, wherein said (D) is conducted while introducing a reducing gas into said processing vessel.

18. The method as claimed in claim 15, wherein said (D) is conducted while returning said product gas obtained from said outlet side filter to said processing vessel.

19. The method as claimed in claim 15, wherein said (D) is conducted after repeating said (A)-(C) for a plurality of times.

20. The method as claimed in claim 15, wherein said gas generator further comprises a switching valve connected to said gas outlet port and configured to switch a flow path of said product gas; a storage tank connected to said switching valve and configured to store said product gas; an outlet side filter connected to said switching valve and is configured to purity said product gas obtained from said gas outlet port and to take out said product gas; and a feedback port connected to said switching valve and configured to return said product gas obtained from said gas outlet port to said processing vessel, said switching valve taking a first state in said (A) in which said gas outlet port, said feedback port, said storage tank and said outlet side filter are disconnected with each other, said switching valve taking a second state in said (B) in which said storage tank is connected to said feedback port, said switching valve taking a third state in said (C) in which said product gas is supplied to said storage tank, said switching valve taking said first state in said (D) in which said gas outlet port, said feedback port, said storage tank and said outlet side filter are disconnected with each other, said switching valve connecting said gas outlet port to said outlet side filter after said (A)-(D) are repeated for a plurality of times.

* * * * *